(12) United States Patent
Piccionelli

(10) Patent No.: US 11,291,099 B2
(45) Date of Patent: Mar. 29, 2022

(54) ORNAMENT APPARATUS, SYSTEM AND METHOD

(71) Applicant: Gregory A. Piccionelli, Wastlake Village, CA (US)

(72) Inventor: Gregory A. Piccionelli, Wastlake Village, CA (US)

( * ) Notice: Subject to any disclaimer, the term of this patent is extended or adjusted under 35 U.S.C. 154(b) by 0 days.

(21) Appl. No.: 17/325,288

(22) Filed: May 20, 2021

(65) Prior Publication Data
US 2021/0361105 A1 Nov. 25, 2021

Related U.S. Application Data

(63) Continuation of application No. 13/828,450, filed on Mar. 14, 2013, now abandoned, which is a continuation of application No. 12/660,748, filed on Mar. 2, 2010, now Pat. No. 8,462,079, and a continuation of application No. 11/810,486, filed on Jun. 6, 2007, now abandoned, which is a continuation of application No. 10/366,008, filed on Feb. 13, 2003, now Pat. No. 7,248,230.

(60) Provisional application No. 61/209,172, filed on Mar. 3, 2009, provisional application No. 60/418,870, filed on Oct. 15, 2002.

(51) Int. Cl.
| | |
|---|---|
| *H05B 47/12* | (2020.01) |
| *G10L 17/00* | (2013.01) |
| *H05B 47/175* | (2020.01) |
| *H05B 47/19* | (2020.01) |
| *G10L 17/22* | (2013.01) |
| *H04W 84/18* | (2009.01) |
| *H05B 39/08* | (2006.01) |
| *G10L 15/22* | (2006.01) |

(52) U.S. Cl.
CPC ............ *H05B 47/175* (2020.01); *G10L 15/22* (2013.01); *G10L 17/22* (2013.01); *H04W 84/18* (2013.01); *H05B 39/085* (2013.01); *H05B 47/19* (2020.01); *G10L 2015/223* (2013.01)

(58) Field of Classification Search
USPC ............. 315/32–75, 127–325; 345/595–596, 345/156–214
See application file for complete search history.

(56) References Cited

U.S. PATENT DOCUMENTS

2005/0116667 A1* 6/2005 Mueller .................. G09F 19/22
                                                              315/312
2005/0275626 A1* 12/2005 Mueller ............... H05B 47/125
                                                              345/156

* cited by examiner

*Primary Examiner* — Marcellus J Augustin
(74) *Attorney, Agent, or Firm* — Gregory B. Gulliver

(57) ABSTRACT

Embodiments of the present invention are directed to an ornamental system, apparatus and method that is dynamically modifiable. Embodiments of the ornament system comprise a processor, at least one ornamental member and a data controller. The processor is a computer or similar device that stores data for transmission. The ornamental member is configured to receive and display data stored in a database. Embodiments of the present invention can be coupled to other ornamental systems across a wide area network, wherein users can share data files for display.

5 Claims, 17 Drawing Sheets

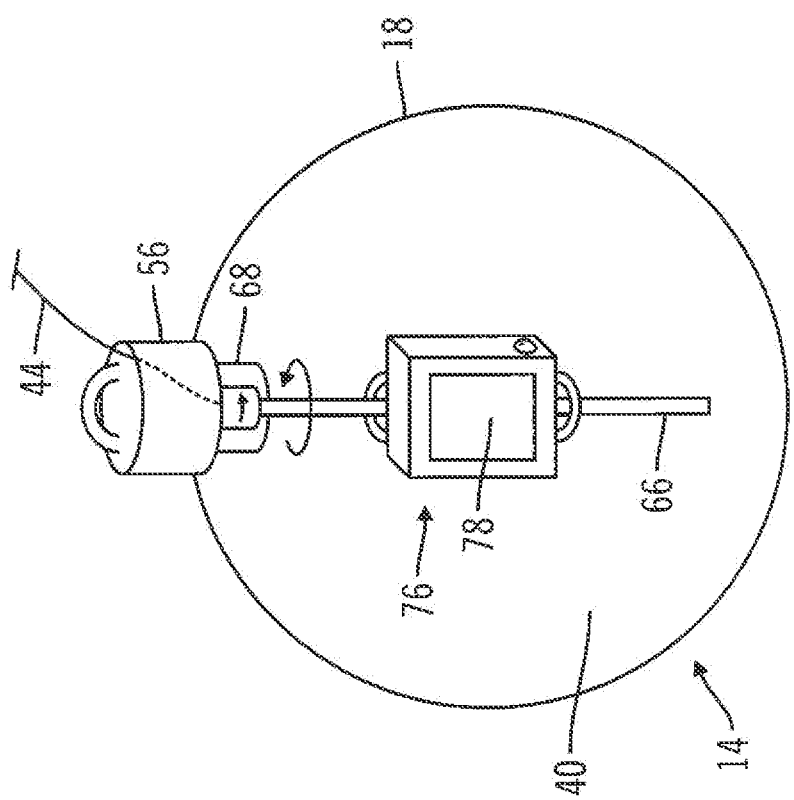

ORNAMENT APPARATUS, SYSTEM AND METHOD

ORNAMENT APPARATUS, SYSTEM AND METHOD

This application is a continuation of U.S. application Ser. No. 13/828,460, filed Mar. 14, 2013, which claims the benefit of U.S. application Ser. No. 12/660,748, filed on Mar. 2, 2010, entitled "Ornament Apparatus, System and Method", which claims the benefit of U.S. Application Ser. No. 61/209,172, filed on Mar. 3, 2009, entitled "Ornament Apparatus, System and Method," application Ser. No. 11/810,486 filed on Jun. 6, 2007, entitled "Ornament Apparatus, System and Method", and U.S. application Ser. No. 10/366,008 (U.S. Pat. No. 7,248,230), filed on Feb. 13, 2003, entitled "Ornament Apparatus, System and Method", which claims the benefit of U.S. Application No. 60/418,870, filed on Oct. 15, 2002. The aforesaid applications are incorporated by reference as if set forth herein in their entirety.

FIELD OF THE INVENTION

The present invention is directed to an ornamental apparatus, system and method. More specifically, embodiments of the invention are directed to a programmable ornamental system and apparatus configured to receive and display user defined images, graphics and text, and a method for electronically coupling a plurality of ornamental apparatuses in a single location or a plurality of geophysical locations.

BACKGROUND OF THE INVENTION

Decoration of Christmas trees with ornaments, garland, tinsel and lights has been a tradition for millions of families for centuries. Indeed, millions of dollars are expended on Christmas tree decorations each year. Often times, ornaments are given as gifts to memorialize a visited place, or an event. Indeed, many families preserve Christmas tree ornaments which they have received from other family members and friends as keepsakes or even family heirlooms.

In addition to giving ornaments as gifts, many consumers collect ornaments. As such, consumers are interested in finding new and novel forms of ornaments, including different shapes, sizes, and colors. Additionally consumers search for unique designs and compositions of ornaments, such as ornaments which include tinsel, electric lights, or consumable material. In light of the extremely large market for ornaments, consumers can find varying types of ornaments. Unfortunately, most of the commercially available ornaments are not of a personal nature for the individuals receiving or purchasing them.

To obtain more personal ornaments, some people make their own ornaments. For instance, hollow balls that can be filled with pictures or other materials are available, as well as, kits for painting precast ceramic ornaments, and clear plastic or glass balls. Although these ornaments allow the ornament to be personalized, once completed, these ornaments are static and cannot be changed. Further still, most people do not have the time to make these ornaments, and thus by default, they must avail themselves of the commercially available ones.

Traditionally, Christmas tree ornaments and similar objects have performed a simple ornamentation function and have not performed additional functions, such as interactive functions, wherein the ornaments provide users with the ability to play interactive games on or with the ornaments, or with other persons via the ornaments. Thus, the traditional ornaments usefulness is merely decorative.

A need in the industry exists for an ornamental system and apparatus which can be dynamically altered to suit the mood of the decorator to allow personalization of the ornament or to communicate multi-sensory information to one or more persons viewing, listening to, or otherwise encountering the ornament. A further need exists for an ornamental system, wherein a plurality of ornamental apparatuses can be coordinated within a single location or between multiple remote locations. A still further need exists for an ornamental system wherein persons may control one or a plurality of ornamental apparatuses on a Christmas tree or other location via controllers, such as computer game controllers or remote controls to provide users with the ability to play games or select content displayed on an ornament or a plurality of ornaments in a single location or multiple locations, including remote locations connected via a wide area computer network.

SUMMARY OF THE DISCLOSURE

Embodiments of the present invention are directed to an ornamental system, apparatus and method that is dynamically modifiable. Embodiments of the ornamental system comprise at least one processor, at least one ornamental member and at least one data controller. The processor is a computer which stores user input data for transmission and coordinates transmission of data to a single ornamental member or a plurality of ornamental members. Users or content providers input data files or other digital or analog information, including live information, via a user interface, wherein the data files include images, text, graphics, audio, video, audiovisual matter, haptic data, scent data, controller programs, including sensor and peripheral device interface programs, recognition programs, or any combination thereof. For example, the input data might be personal data to the user, such as family photographs, a holiday video or an old love letter. Additionally, the data can be a music file, such as an MP3 file, an audiovisual file, such as a home video, a haptic or texture data file, a scent or odor data file work, a game program, a file of any of the above types produced by a third party content provider, such as a professional content provider, or one or more combinations thereof.

The processor coordinates with the data controller to select and transmit data files to the ornamental member. The ornamental member comprises a display member which displays transmitted user or content provider information, wherein the information is received by the ornamental member via a receiving member and a body or housing. In some preferred embodiments, the ornamental member further comprises a variety of features, including, but not limited to, one or more means for attachment to a Christmas Tree, special effect generation means, including but not limited to an object, sound, light, motion, scent, odor, haptic, texture, smoke, or confetti, one or more light, sound, tactile, texture, haptic, heat, motion, chemical, radio signal and/or controller input sensors and/or information capture devices, one or more motors for producing motion and/or vibration, and a means for generating gaseous, liquid, semi-liquid and/or solid materials, such as smoke, colored smoke, confetti, glitter or Silly String®.

In some preferred embodiments, the ornamental member includes a data input and/or power input which comprises a connector or other means of attaching the ornament or a plurality of ornaments to one or more data or power delivery cables or wires, attachment node or other support, which may be strung or otherwise configured upon on a Christmas tree or other ornamental support object. In some embodiments, the data and/or power connector can also provide the physical means of attaching, fixing or hanging the ornament upon the Christmas tree or other ornament support. In some preferred embodiments, the limbs of an artificial or partially artificial Christmas tree can be configured to include on or within the limbs, branches, needles, or combination thereof, the hanging or attachment places for the ornaments which can also communicate data and/or power to the ornament via or in association with the hanging means.

The display member is a screen or any other device capable of displaying visual information, including, liquid crystal or plasma displays, LED displays or arrays, charged-couple devices, heads-up displays, holographic generators, projection display means, fiber optic displays, bioluminescent devices, electro-chemical displays, electron gun-based displays, micromirrors or any other digital light processing means, which is disposed on or integrated into the interior portion of the body of the ornamental member. In some preferred embodiments, the display member is integrated within a transparent, partially transparent or semi transparent portion of the body of the ornamental member. In instances where the display member is integrated into or disposed on the outer body of the ornamental member, the displayed image forms a dynamic component of the decorative or interactive features of the ornamental member. The body of the ornamental member can form any shape, thus, the transmitted data could be part of, or complimentary to, the shape of the ornamental member to enhance its decorative or interactive features. For example, data corresponding to a face can be transmitted to a head shaped portion of an ornament shaped as a human body. In some preferred embodiments, the shape of the ornament is dynamic whereby motion or shape reconfiguration means, such as electric motors can change the shape of the ornament in response to or in coordination with content displayed by the ornament. Ornament shape change may also be controlled by game programs, user instruction, such as by remote control or voice command or data received via a sensor or a remote user, such as by data transmitted to the ornament or ornament system via a wide area computer network.

An image displayed on the display member is projected for viewing by persons looking at the ornament. As the displayed data can be personal, such as an image of a family member, the ornamental member is transformed into a personalized decoration. For example, data comprising a video of the face of a family member can be projected via a display member in or on the head shaped portion of Santa Claus ornament.

In some preferred embodiments, the ornamental member can include a single display member or multiple display members. Thus, more than one data file can be displayed by a single ornamental member. In further embodiments, the ornamental member can combine display members which are located both within the interior of the ornament and on the outer body of the ornamental member such that the data displayed on the displays can be coordinated. For example, a display integrated into the outer body centered in front of a display located within the interior could allow the creation of effects such as simulated motion into or out of the ornament, three-dimensional looking scenes and other types of depth effects.

The receiving member is a signal receiving means, such as, an antenna, a wire transmission means, an optical transmission means, a biodigital interface, a sensor apparatus or any other data receiving means. In some preferred embodiments, the receiving member is embedded within the body of the ornament or is coupled to the exterior of the ornament, such as the top of the ornament, and is electronically coupled to one or more display members and to the processor. The receiving member receives data transmissions from the processor and transmits the data transmissions for display on one or more display members.

In addition to the receipt and display of images, in other preferred embodiments, the ornamental member can be configured to receive a variety of information. For example, in some preferred embodiments, the ornamental member can include one or more sound generating means, such as speakers, including vibrating membranes, and mechanical sound production means, such as a mechanical music box scent. In other preferred embodiments, sound generating means such as flat panel or planar magnetic speakers, for example sound generating devices similar to planar magnetic speakers sold by Sonigistixs, can be located within the outer member or integrated into the outer surface of the ornament. In still other embodiments, the ornamental member comprises a variety of enhancement devices, including, but not limited to, odor generating means, such as computer controlled reservoir release devices; tactile sensory stimulation means, such as, for example, motors to produce vibration; engine for production of special effects, such as the production of gaseous, liquid, semi-liquid or solid materials, such as smoke, "Silly String" or confetti; light effects generators, such as laser and strobe light generators; and chemical reaction output means.

To operate, an internal power source, such as a battery or solar cell, resides within, is coupled to, or is integrated into, the ornamental member. In some preferred embodiments, the ornamental member is coupled to an external power source such as the power source for decorative lights on a Christmas tree, or an independent power line which supplies power to one or more ornamental members. In some preferred embodiments, the power source can be power lines integrated into one or more artificial Christmas tree limbs and accessed by tapping into such lines via plugs, hooks or any suitable connector means. In further embodiments, the limbs of an entire artificial Christmas tree could be so configured to provide power to the ornaments.

The data controller is one or more software programs that operate in conjunction with the processor and is configured to control the selection of data transmitted to the ornamental member. The data controller includes a user interface which accepts user defined data. The user defined data is stored in a storage database coupled to the processor.

In operation, the controller, processor and ornamental member are in electronic communication with each other. Upon instructions from the processor to transmit data, the data controller retrieves the appropriate data files from the storage database and transmits the data to the receiving member of the ornamental member via the processor. The receiving member transmits the data to the display member for display on the ornamental member.

A feature of preferred embodiments is that ornamental members can electronically display personal data, such as video and audiovisual clips, photographs, images and text. An advantage to this feature is that ornamental members can be personalized. A further advantage to this feature is that the ornamental members can be personalized without the requirement for the user to personally decorate the ornamental member.

A further advantage is that the ornamental members can also display professionally produced data, including computer and video games, films, music videos, electronic greeting cards and the like. Another feature of preferred embodiments is that data files used for display on the ornamental members can be changed at any time. An advantage to this feature is that the ornamental members can display a variety of data such that the ornamental members are dynamic in appearance.

A still further feature of preferred embodiments is that a plurality of ornamental members can be coupled together. An advantage to this feature is that the set of ornamental members can be combined in a coordinated display. For example, in some preferred embodiments an array of several ornamental members can provide a means for displaying photographic, video or audiovisual matter from a plurality of angles on different ornamental members.

A further feature of preferred embodiments is that families in different geographic locations can display family data shared from a common database. An advantage to this feature is that only a single data file is required for use and thus, multiple copies do not have to be sent to other family members for sharing.

Another feature of preferred embodiments is that the ornamental members can include one or more cameras and/or microphones. An advantage to this feature is that families in different locations can transmit and receive live video and sound simultaneously via the Internet or other wide area computer network on a plurality of such ornaments. In this manner many geographically separated persons or branches of a family may simultaneously share their holiday via their respective ornament array.

In accordance with another aspect of the present invention, there is provided an ornamental member that is configured to attach to a Christmas tree and configured to receive input data from a data source. The ornamental member includes a body, at least one projector, and a receiving member. The body has a hollow interior, and at least a portion of the body is partially transparent, opaque, semi-transparent, transparent or otherwise translucent. The at least one projector is configured to project one or more of the following group of display data: image data, text data, video data, audio data, audiovisual data and graphic data. The least one projector is disposed within the hollow interior of the body, is mounted on a support coupled to the interior of the body of the ornamental member, and is configured to project a display on at least a portion of the body that is partially transparent, opaque, semi-transparent, transparent or otherwise translucent one or more of the following group of input data: image data, text data and graphic data. The receiving member is configured to receive the input data, and is coupled to the body. The at least one projector is in electronic communication with the receiving member.

In accordance with another aspect of the present invention, there is provided an ornamental member that includes a body, at least one display member, and a data receiving member. The at least one display member is configured to display one or more of the following group of input data: image data, text data and graphic data, and at least a portion of the body is formed by at least one of the at least one display members. The data receiving member is configured to receive data from at least one data source, the data receiving member being in electronic communication with the at least one display member, wherein the data source is selected from the group consisting of: an internally-mounted processor, an externally-mounted processor, an external processor, a video player, a CD player, a network server, a mobile telecommunication device, an MP player, a greeting card having electronic data stored therein, a separate ornamental member, and an item configured to interact with the ornamental member, the item being selected from the group consisting of a toy, an interactive greeting card, and an item having an RFID.

Other features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which FIG. 16 depicts an ornamental member including a non-projector display unit in accordance with a preferred embodiment of the invention.

DETAILED DESCRIPTION OF THE PREFERRED EMBODIMENTS

Embodiments of the present invention are directed to an apparatus, system and method for an ornamental member, and an ornamental system. With reference to an ornamental member, the ornamental member comprises a body, a display member, a receiving member and in some preferred embodiments a power source.

Figure 1:
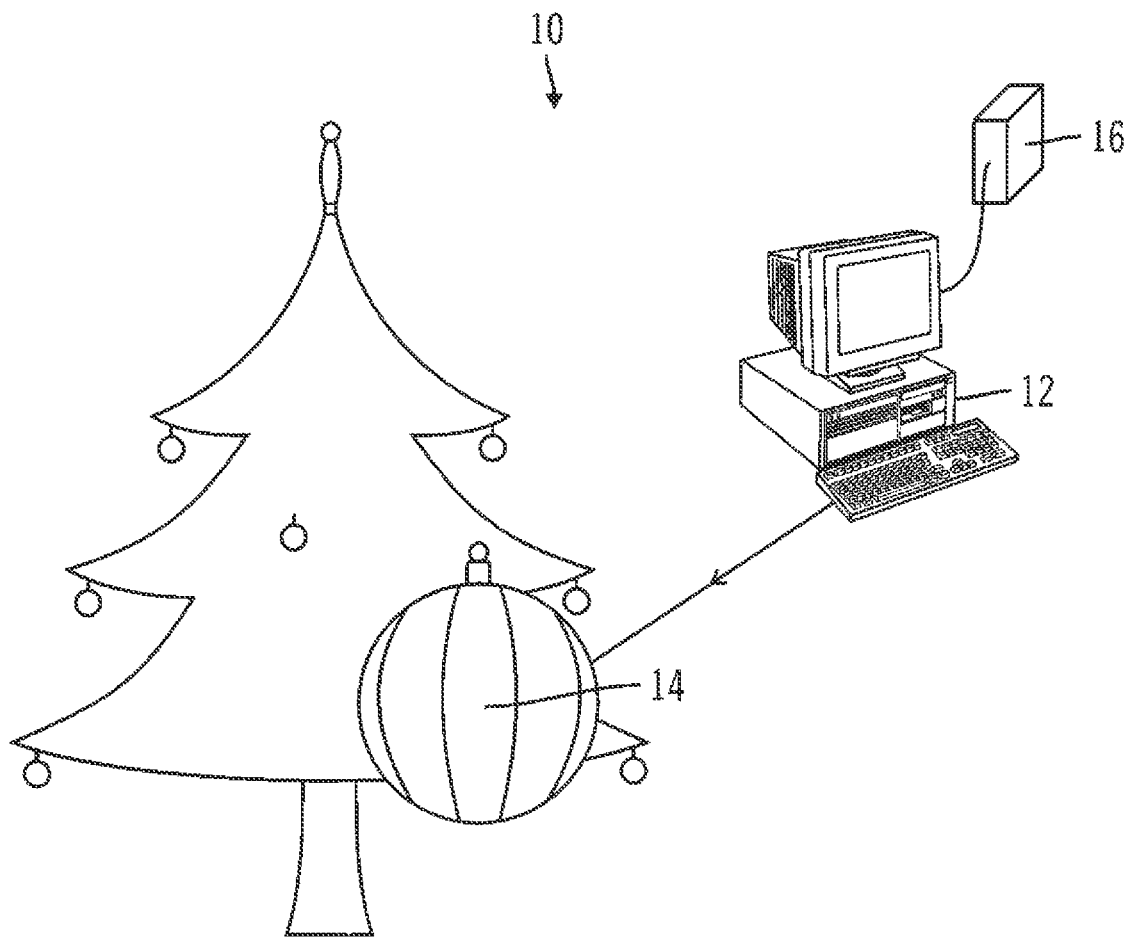
FIG. 1 depicts an ornamental system in accordance with a preferred embodiment of the invention.

With reference to FIG. 1, embodiments of the ornamental system 10 comprise at least one processor 12, at least one ornamental member 14 and at least one data controller 16. The processor 12 is a computer which comprises a programmable processor capable of operating in accordance with programs stored on one or more computer readable media (for example, but not limited to floppy disc, hard disc, computer network, random access memory (RAM), CD Rom, and the like), a display device for providing a user-perceivable display (for example, but not limited to visual displays, such as cathode ray tube CRT displays, light-emitting-diode LED or liquid-crystal-diode LCD displays, plasma displays or the like, audio displays, scent or odor producing displays, tactile displays, special effects generators, light effect generators, motion generators, mechanical sound generators and chemical reaction devices), and a user input device (for example, but not limited to, a keyboard, mouse, microphone, camera, light, heat or motion sensors, game controller interface sensors, recognition system input devices, and the like, or any combination thereof). In one preferred embodiment, the controller comprises a personal computer system having a CRT display, a keyboard and a mouse user-input device. In some preferred embodiments, the processor 12 is coupled to other computers in a network, including, but not limited to, a closed or intranet configuration, an open or public-access network configuration or combinations of such configurations, as is well known in the art.

Figure 2:
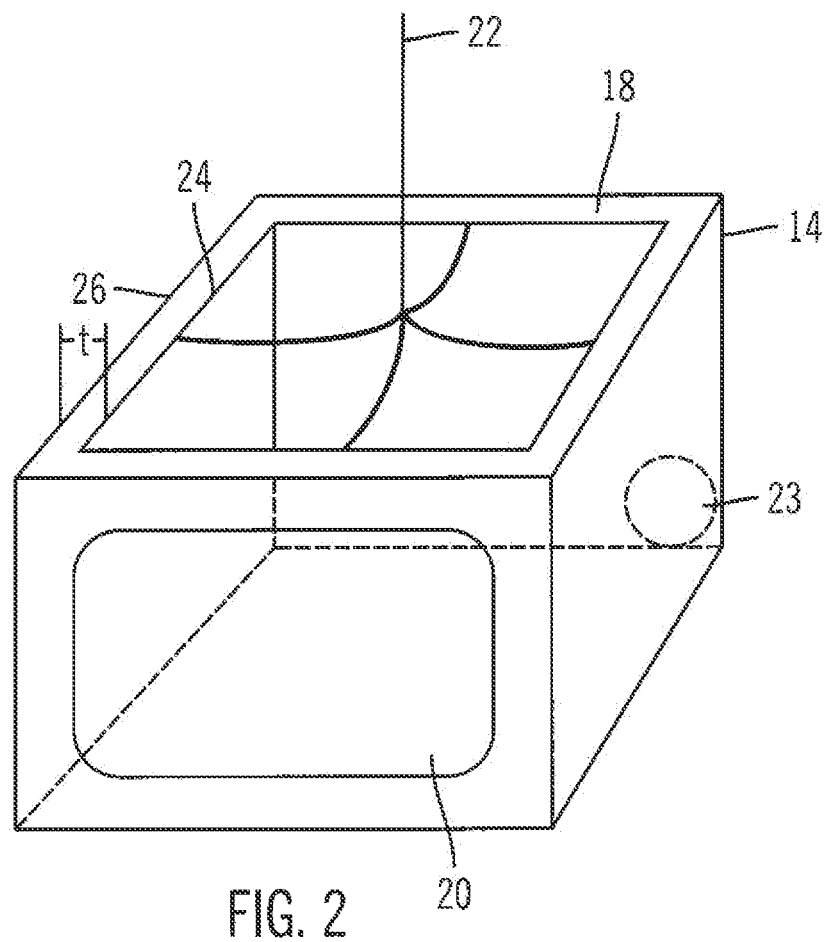
FIG. 2 is an ornamental member in accordance with a preferred embodiment of the invention.

With reference to FIG. 2, the ornamental member 14 is a decorative type member, such as an ornament for a Christmas tree. The ornamental member 14 comprises a body 18, a display member 20, a receiving member 22 and a power source 23. The body 18 is hollow and comprises an inner diameter 24 and an outer diameter 26, having a thickness t between the inner diameter 24 and outer diameter 26. In some preferred embodiments, the body 18 is a solid member. The body 18 can be made from a single contiguous piece or multiple segments coupled together. Further, the body 18 can be made from any materials, including, but not limited to plastic, ceramic, glass, aluminum and metallic alloys, and can form any shape, including, but not limited to, spheres, cubes, pyramids and squares. Further, the body shape can include irregular shapes, such as, for example, figures of characters, faces, animal bodies and celestial bodies. Further, the body of the ornamental member can be contiguous with or integrated into the body of one or more additional ornamental members, other decorative objects or a larger object such as an artificial Christmas tree.

Figure 3:
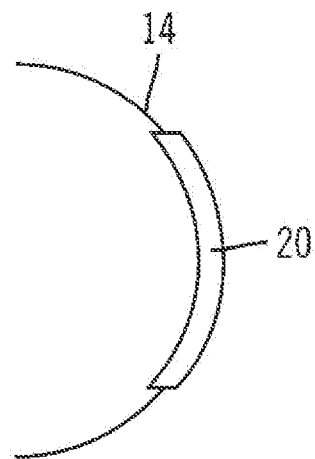
FIG. 3 is a display member coupled to the body of an ornamental member in accordance with a preferred embodiment of the invention.
Figure 4:
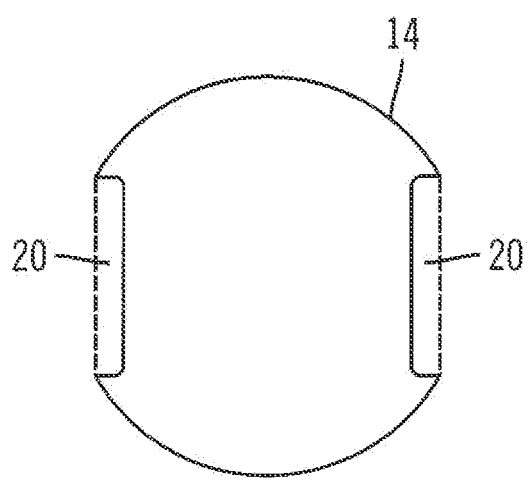
FIG. 4 is a display member embedded within the body of an ornamental member in accordance with a preferred embodiment of the invention.

The display member 20 is a screen, such as a liquid crystal device, or any other suitable device for displaying a digital or electronic image. With reference to FIG. 3, the display member 20 is disposed on the surface of the outer diameter 26, or, in some preferred embodiments (FIG. 4), is embedded between the inner and outer diameter such that the display member 20 is flush with the outer diameter of the body and forms a portion of the outer surface of the body 18.

Figure 5:
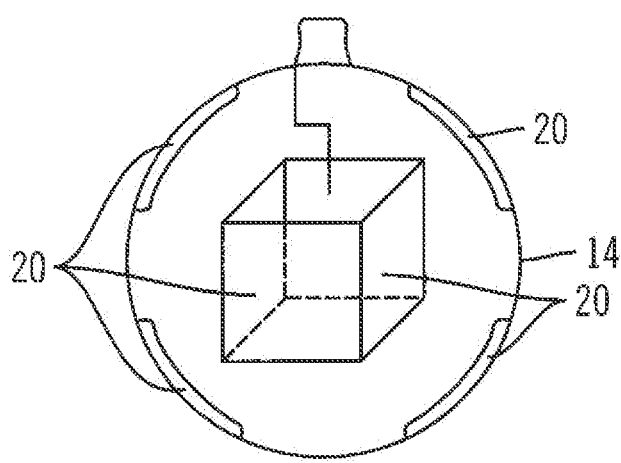
FIG. 5 is an ornamental member having a plurality of display members in accordance with a preferred embodiment of the invention.

The display member 20 can extend over the entirety of the body, thereby forming the body 18, or across a portion of the body. The display member 20 can be a contiguous member or can comprise several smaller members, wherein the combination of the smaller members form the entirety of the display member 20. An image displayed on the display member 20 will be projected such that the image can be viewed from the exterior of the body 18, such as, by a person looking at the ornament. If the display member 20 only extends across a portion of the body 18, the remaining portion of the body 18 can be decorated by any suitable means. With reference to FIG. 5, in some preferred embodiments, a plurality of display members 20 exist in single ornamental member 14, wherein each display member 20 can allow the viewing of an image, or groups of display members 20 can allow the display of a single image across the group of display members 20.

Figure 6:
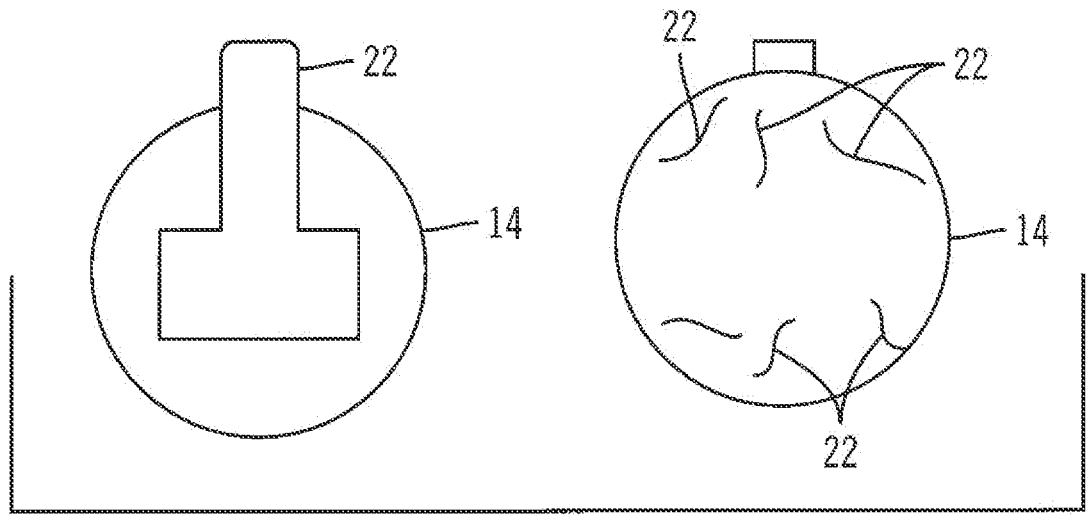
FIG. 6 depicts a receiving member embedded within the body or coupled to the body of the ornamental member in accordance with a preferred embodiment of the invention.

The receiving member 22 is a wire receptor or any suitable means of receiving data, including, but not limited to, an antenna, hard wired input means and optical data input means. In preferred embodiments, the receiving member can receive data transmitted by any means, including, but not limited to, data transmitted via radio transmission, such as Blue Tooth technology, optical transmission such as optical link means or by hard wire transmission. With reference to FIG. 6, in some preferred embodiments, the receiving member is embedded within the body 18 of the ornament or is coupled to the top of the ornament. The receiving member 22 is electronically coupled to the display member 20 and to the processor 12. The receiving member 22 receives data transmissions from the processor 12, or other similar device and transmits the data transmissions for display on the display member 20.

The power source 23 is an internal power source that resides within, or is coupled to, the body 18 of the ornamental member 14. In some preferred embodiments, the power source 23 is a battery, although any means capable of providing power to the ornamental member 14 such as a solar cell is suitable. In some preferred embodiments, the ornamental member 14 is coupled to an external power source such as the lights on the tree, or an independent power line that is plugged into an electric power supply.

In some preferred embodiments, the ornamental member further comprises a data storage means, such a Memory Stick reader, CD Rom drive, CD player, DVD player, videotape player, MiniDisc player, smart media reader or other such device. In some such preferred embodiments the data transmitted to the display member 20 is transmitted from the storage means contained on or within the ornamental member. In some preferred embodiments wherein the ornamental member includes a data storage device, such ornamental member can function as a processor whereby data contained in the data storage device is transmitted to one or more receiving ornament members for display on the receiving ornament members.

The data controller 16 is a software program that resides within the processor or is coupled thereto. The data controller 16 is configured to control the selection of data transmitted to the ornamental member 14. The controller 16 includes a user interface which accepts user defined data and instructions for the transmission of the data. The user accesses the user interface and inputs and identifies data files or identifies their storage location. Additionally, the user can identity sources for data transmissions. To identify data files, locations and sources, the user defines data markers, wherein each data marker identifies a data file or a data transmitting source. In preferred embodiments, a plurality of data markers can be identified for each input data. For example, a data marker can identify a particular data file stored in the storage database, the storage location of a data file for retrieval, or the source from which to receive transmitted data. An identified source can include, but is not limited to, one or more cameras, a video cassette players, DVD players, CD players, other digital storage devices, including hard drives and media readers, microphones, one or more ornamental members which are configured with data input devices, remote sensors, including tactile data sensors, broadcast sources, such as radio, television, and satellite and cable transmissions. As evinced from the discussion, the data markers need not be associated with particular input data, but rather, can identify a source from which any data could be transmitted. In this regard, a source capturing live transmissions can be identified without association to a particular data file.

The user defined data markers are stored in a storage database coupled to the processor 12. As discussed above, if the data marker is the identification of a data file being input by the user, the data file itself is stored in the storage database. If the data marker identifies a source for data, the source device is coupled to the ornamental system. As discussed below, the markers can be used to create instructions for transmitting data.

If the user desires to enter non-computer compatible data, such as an actual photograph, the user first converts the data by any suitable means, including scanning images. The converted data file can then be converted into an appropriate format via external devices, or in some preferred embodiments, the data controller will format the file prior to storing it in the storage database. The user defined data can include, but is not limited to, image, text, graphics, videos, digitized tactile data, motion capture data, data corresponding to scent or odor, and any combination thereof. The user defined data can include any type of data, including, but not limited to, family photographs, personal messages, letters, family movies and the like.

In preferred embodiments, the user interface facilitates the generation of instructions for use by the controller 16, wherein the instructions relate to the transmission of data from
the controller 16 to the display member 20. The instructions can be general or can specify data markers in association with various parameters, such as, time or a specific display member. For example, the user can select the length of time that any data is displayed or, if multiple data files exist, can identify the data to be displayed for a specific time period.

In preferred embodiments, the transmission of the data to the ornamental member is accomplished via any suitable means, including, but not limited to, blue tooth technology, wireless network means, or any other suitable means by which the information could be transmitted to the ornament. If more than one display member 20 exists in an ornamental member 14, the controller 16 can coordinate the display of data per display member 20, or can allow for the automatic distribution of data among the display members 20. In instances wherein the user inputs insufficient data, for example, one data file for multiple display members, or only inputs enough data for display by an ornamental member 14, for example, one data file per display member, in some preferred embodiments, a default instruction will distribute the data to the display members without instructions from the user. If a source for transmission is identified, the data transmitted from these sources will be distributed among the available ornamental members. In some preferred embodiments, a specific ornamental member can be predesignated to display data from a predefined source. In some of these instances, if no data is transmitted from the source, a default image is displayed.

In operation, the data controller 16, processor 12 and ornamental member 14 are in electronic communication with each other. When the system is powered, for example, the tree lights are plugged in, or the system is loaded into the processor, instructions to transmit data are forwarded to the controller 16. Upon receipt of the instructions to transmit data, the controller 16 retrieves the appropriate data files from the storage database and transmits the data to the receiving member 22 of the ornamental member 14 via the processor 12. The receiving member 22 transmits the data to the display member 20 for display. Once the image is transmitted to the display member 20 of the ornamental member 14, for example, the image of a loved one, a very personalized ornament is created. The ornamental member 14 is typically hung from a Christmas tree, and thus, adds to the
personal nature of the holiday decorations. The image displayed in the ornamental member 14 can be changed at any time by the user storing new data or by instructing the controller 16 to transmit a different image file. As discussed above, instructions can be provided to the controller 16 prior to the use of the ornamental system, or data can be automatically distributed among the display members 20. By this means, users of the programmable ornamental system can transmit photographs, videographs, and/or audiovisual works of family members, deceased family members, friends, political or religious icons, and recordations of treasured family moments.

In other preferred embodiments, the ornamental apparatus comprises an auditory generating device, such as speakers, or mini generators, wherein the auditory generating device is configured to receive instructions from the data controller 16 to generate and produce the transmitted auditory data, such as sound associated with a video transmission. In some preferred embodiments, ornamental members 14 having auditory transmission capability do not include display members 20 such that the ornamental members 14 simply provide auditory data, such as a 'hello' and 'I love you' from grandma.

Further, in still other preferred embodiments, a proximity sensor is coupled to the ornamental member 14 such that during use of the ornamental system, when a person is within a predefined distance from the ornamental member 14, the ornamental member 14 automatically plays music or a video. In these instances, if the ornamental member 14 includes a display member 20, a static image is displayed on the display member 20 until the proximity sensor triggers the ornamental member 14 for dynamic display. In some preferred embodiments the ornaments also contain the means for performing recognition of persons by voice, face, digital identification signal generated by devices such as cellular telephones, and other such digital signals. In some preferred embodiments, an appropriately configured ornament could, for example, recognize a family member in the proximity of the ornament and display data directed to the particular family member on one or more ornament displays. For example, images of the family member at a young age or with grandma.

The above described embodiments have been described with reference to one ornamental member 14. However, it is to be understood that any number of ornamental members 14 can be coupled together. Indeed, a plurality of ornamental members 14 can be used to decorate a single tree. In these instances, the data controller 16 automatically, or upon directions input by the user, transmits data to each ornamental member 14 in the system. When a plurality of display members 20 exist in an ornamental member 14, the receiving member 22 is configured to process signals received from the controller 16 and discern through which display member 20 the processed data will be projected, that is, which display member 20 will receive the processed data.

In some preferred embodiments, the ornamental members 14 are coupled together via a power cord such that all ornamental members 14 are powered by a single source. In other preferred embodiments, a combination of power sources could be used to power a group of ornamental members 14, including, but not limited to, internal power sources and external power sources, wherein some of the ornamental members 14 are electronically coupled together.

The array of ornaments can provide the user with a coordinated performance of photographic, video and audiovisual content upon several ornaments. In preferred embodiments having auditory processing capacity, the receiving members 20 will also output processed auditory information to the sound generating devices, such as speakers, planar magnetic sound generators, or other mini generators resident within the body 18 or integrated into, or disposed upon the surface of, the outer part of the body of the ornamental member 14. To avoid overlapping auditory data, one set of speakers is typically used per ornamental apparatus regardless of the number of display members 20. However, coordination of speakers may be employed such that multiple auditory streams can be combined with the appropriate image data. In some preferred embodiments, the sounds produced by ornamental members having auditory transmission capability can be coordinated by the data controller to produce sounds which are related to one another, such as separate parts of a musical composition. For example, different musicians in a music video can each be displayed on separate ornamental displays simultaneously.

Similarly, the sounds of different instruments can be played from different ornaments. Additionally, apparent movement of images and sound around a Christmas tree can be accomplished as such data is sequentially displayed from one ornament to another. In some preferred embodiments, such sounds, music, greetings, and the like, can be serially produced by the auditory transmission devices in separate ornamental members whereby one ornamental member produces a sound which ceases prior to the commencement of sound production by one or more other ornamental devices. It is to be understood that the present invention is not limited to any type of coordination of display by and among the ornaments, and contemplates the use of any type of such coordination and dynamic distribution of displays and data related thereto.

Figure 7:
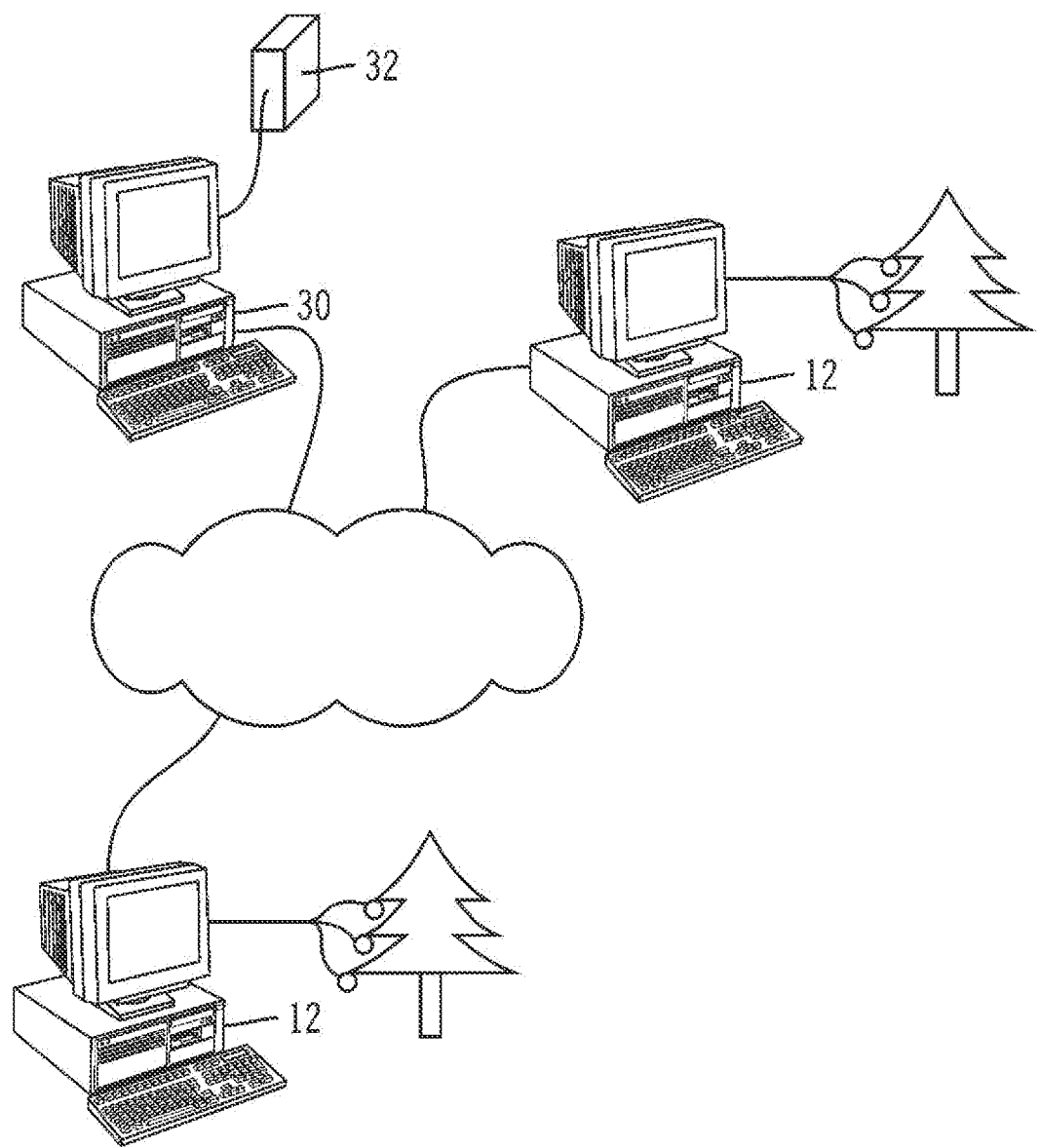
FIG. 7 is an ornamental network system environment in accordance with a preferred embodiment of the present invention.

It is to be further understood that the ornamental system can be operated on a network such as the Internet, or World Wide Web ("WWW"), such that a plurality of ornamental members 14 located in locations remote from each other can share user defined data. With reference to FIG. 7, a plurality of processors 12 are located in geographic locations remote from each other. In preferred embodiments, the user accesses a central processor 30, wherein a central data storage 32 exists which contains stored data files for use in the local ornament system. The files in the central data storage can be input via the local processor as described above. However, the files can be stored in a central storage location. The central processor 30 is configured to transmit predefined data files to each of the local processors 12. If desired, the local processors 12 can select data from the central data storage 32, can operate utilizing its own local images, or a combination of use. In these systems, users of the programmable ornamental system can transmit photographs, videographs, and/or audiovisual works of family members, deceased family members, friends, political or religious icons, and recordations of treasured family moments, live video, and video corresponding to video being captured in another location for transmission to a remote location via the Internet or other wide area computer network. Further still, if a user group, such as a family, establishes a peer-to-peer networking system, members of the peer-to-peer system can access the data files of other members for use on their local system, that is, image files among the family members can be shared from local storage databases. Further still, the system can be configured for sharing among unrelated users, wherein the data set for one or more ornaments or the entire ornamental array can be obtained from an external source. For example a user may want the ornament set currently being used at the White House or "Madonna's ornament program". In this regard, users can access data sets made available by other users, and further, can share their own data if desired.

In some preferred embodiments, the geophysical location of the ornament, determined by any means, such as a GPS detector, can function as a predicate for retrieval of appropriate programs and other audio, video, audiovisual, tactile, scent, and odor. In addition to providing useful options to the users and advertisers when such location information is used to send appropriate advertising information, this feature also provides users, such as parents with the ability to participate in content blocking systems whereby information is blocked from transmission to locations. Since it is contemplated that users may also use the ornamental input and output systems connected to the Internet and other networks for the purposes of wager-based gaming, the ability for a provider of such services, or other services such as adult entertainment or other adult product advertising (tobacco products, alcoholic products, and the like), to be able to determine the location of the user would be critical to conform to laws pertaining to prohibition of gaming or distribution of such adult materials in certain locations.

In other preferred embodiments of the invention, the ornamental member can contain heat, fire and/or motion detectors which, when triggered can transmit data via communication with the processor to a user, a security company, fire department, police, or other appropriate personnel via the Internet or other wide area computer network. In still other preferred embodiments, such communication with a user can also be performed by outputting production by sound and/or light generation means in one or more of the ornaments themselves, instead of, or in addition to, notification via a wide area computer network.

In some preferred embodiments, the ornamental member can also include a device for determining its geographic location, such as a GPS receiver, whereby information relating to the location of the ornament can be transmitted via the controller to remote locations via the Internet or other wide area computer network. In further embodiments, notification of the triggering of heat, fire and/or motion detection sensors can be associated and transmitted with location information to assist a security company, fire department, police, or other appropriate personnel in responding to the proper location after receiving such notification.

In some preferred embodiments, advertisers can make advertising available for display via the ornament member displays. In further embodiments, such advertisements can be tailored and transmitted to specific ornament locations for maximum advertising efficiency. In still further embodiments, electronic greeting cards can be transmitted to the ornaments and displayed thereupon and therein.

Figure 8:
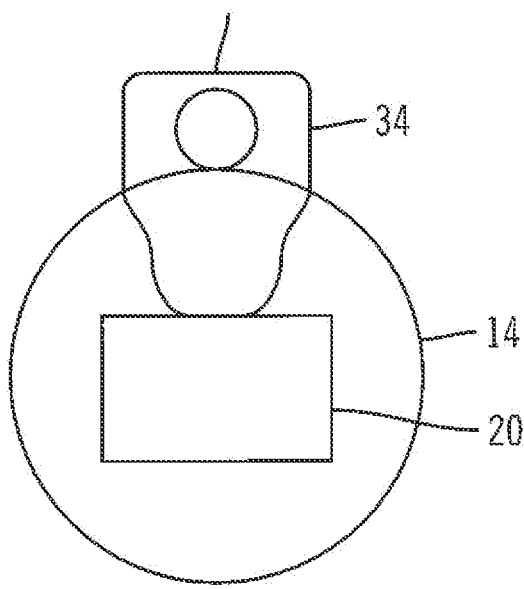
FIG. 8 is an ornamental member coupled to a camera in accordance with a preferred embodiment of the invention.

In addition to use on networks, or via stand alone computers, in some preferred embodiments and with reference to FIG. 8, the ornamental member 14 can be coupled to a wired or wireless camera 34. The camera 34 can be coupled to the ornamental member 14 or can be placed in any suitable location within the room, wherein the captured image data is displayed in the designated ornamental member. In addition to displaying the captured image data in the local ornamental members 14, the image data can be transmitted to other devices for display, such as computers, televisions, personal digital assistants, and to other ornamental members in remote locations. Thus, celebrations on the east coast can be shared with family members on the west coast via a wireless transmission or any other suitable means. In still other preferred embodiments, the ornaments can project images onto walls, or other appropriate surfaces.

In further embodiments, wherein the ornamental member includes one or more cameras, sound capturing devices and audio outputting devices, the ornaments can function as a means for providing translation services to persons with similarly configured ornaments. In such embodiments, two persons who speak different languages can associate a translator via the Internet or other wide area computer network. In this manner users can share their holiday experience with those that do not speak the same language.

Overall, each ornamental member 14 has one or more display members 20 and potentially some, or all, of the ornamental members 14 include sound generation means, such as speakers or a mini tone generator. The ornamental members 14 can work either by themselves or in series with each other, wherein information can pass from one ornamental member 14 to another via the controller. The number of display members 20 coupled to an ornamental member 14 is dependent, in part, on the size or style of the ornamental member 14. Each display member 20 displays photographs, video data, computer generated information such as graphical information. Further, sounds can be synchronized with the videos or correspond to the images or text. The sound can be synchronized or pertain to the visual information on the display members 20 of one ornamental member 14, or can be synchronized with visual information on many ornaments, or synchronized with audio information on several ornamental members 14, or any combination thereof. In some preferred embodiments, a set of ornamental members 14, such as fifteen ornaments, could correspond to a different tone or a different instrument or sound such that a song could be performed by the set of ornamental members 14, wherein the song could be a commercially prerecorded song or a user created song. In some preferred embodiments, the ornamental members can produce audio, sounds and music in response to MIDI control. In some of these embodiments, the ornamental member includes a MIDI sound generator.

Figure 9:
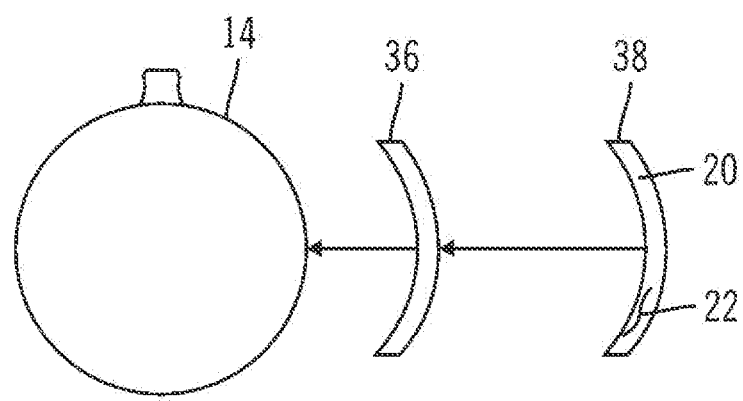
FIG. 9 depicts an attachable coupling member and an overlay member for attachment to an ornamental member in accordance with a preferred embodiment of the invention.

While the invention has been particularly shown and described with reference to a preferred embodiment thereof, it will be understood by those skilled in the art that various other changes in the form and details may be made therein without departing from the spirit and scope of the invention. For example, in some embodiments, the system can include an ornamental branch assembly wherein the branches are artificial and have prehung ornaments, or wherein the branches are the power means for the system such that attaching the ornaments to the branches activates the system. Further, in other preferred embodiments an individual ornament can have its own internal data storage for audio, video, audiovisual files, and the like. In further embodiments, an ornament can also function as dictaphone, photo, video, audiovideo or tactile capture device whereby such data is stored in the ornament and/or is transmitted to one or more external data storage devices. In still other embodiments, ordinary ornament bulbs can be modified with adhesive attachments. For example, with reference to FIG. 9, a coupling member 36, such as a magnetic piece, can be coupled to the commercially made ornament bulb, for example, by glue, and an overlay 38, for example, an overlay having a magnetic backing, could be coupled to the bulb, for example, magnetically, wherein the overlay 38 includes a screen, a chip, and an antenna. A single overlay, or a plurality of overlays could be placed on a single ornament. The overlay could be made in any shape, including, but not limited to, a square, circle or rectangular strip that wraps around the bulb, and can be coupled by any suitable means. Larger overlays could include more than one screen, such that multiple screens could be displayed on the ornament. In this manner, a user can easily modify existing or inexpensive ornaments to create the system.

In still further embodiments, replaceable canisters for the effect generation means are included. For example, replacement canisters for scent production, silly string, confetti, and the like, are coupled to an individual ornament or by other suitable means.

In some other preferred embodiments, the ornaments can be manually or automatically switched from a primary to a secondary, or tertiary, data controller, such as, for example, a television remote controller. In this regard, the programs on the ornaments can be controlled to change the display on the ornaments. Further still, a ribbon could contain a series of displays, wherein the ribbon is placed around the tree, in a manner similar to garland. In this regard, different screens could be activated on the ribbon at different places on the tree.

Figure 10:
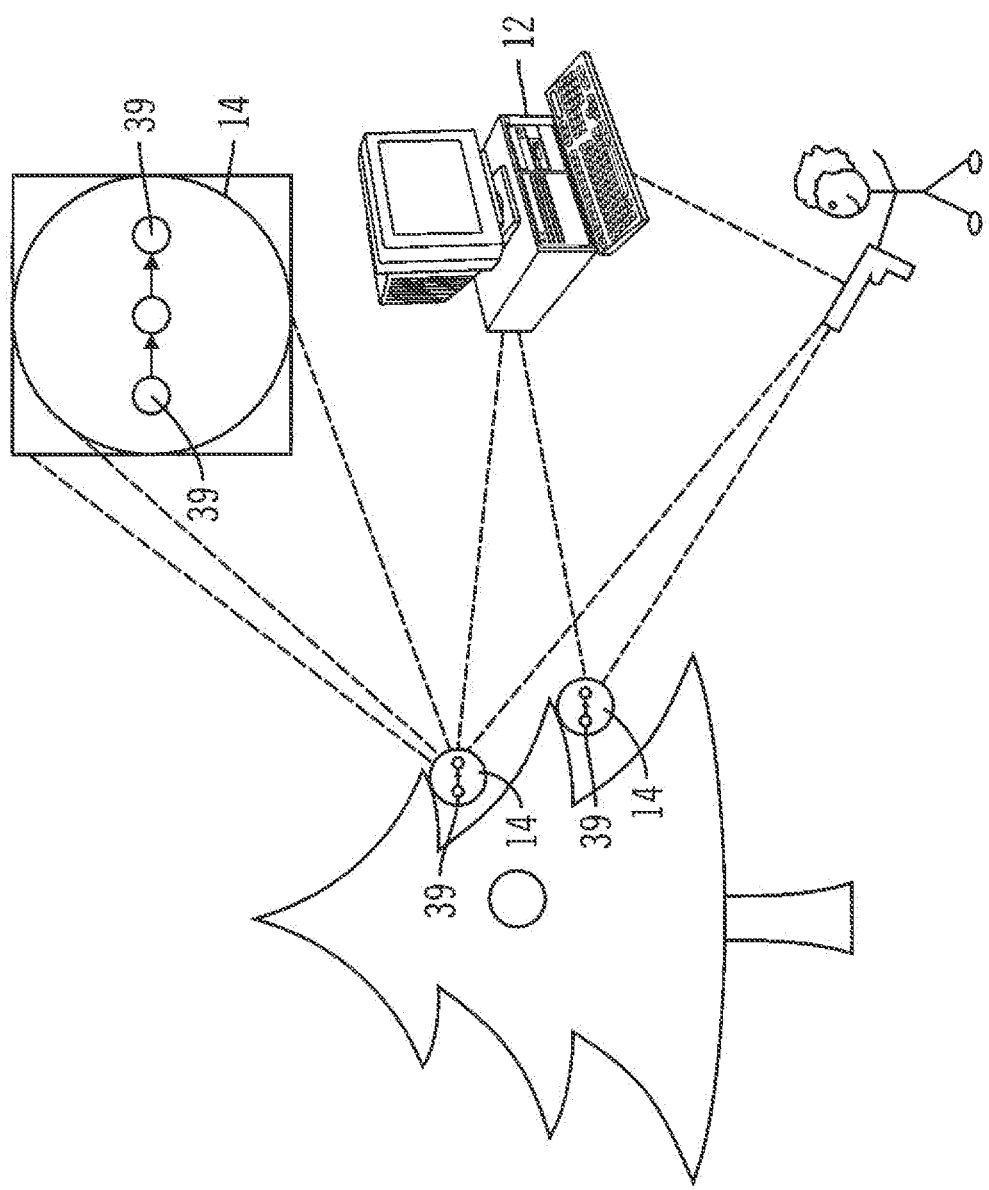
FIG. 10 depicts a user utilizing a game controller in a preferred embodiment of the invention, FIGS. 11 *a-b* are front and left side partial cutaway views of a preferred embodiment of an ornamental member having a hollow interior within which a projector is disposed.

In further preferred embodiments, the ornamental member contains sensors and interface means for receiving signals from game controllers. In these embodiments, the ornamental members and the displays associated therewith can function as components of a gaming system. With reference to FIG. 10, for example, a person with a game controller such as a light rifle could engage in a game whereby targets 39 are simultaneously or sequentially displayed on the ornament displays and the user attempts to shoot the targets thereby displayed. When the user has properly aimed and fired at a target so displayed, the game controller sensor, in this case a light sensor, can register a successful action and product notification thereof, such as by changing the display to indicate the successful action and/or produce one or more sounds via the ornament's, or ornaments', sound generator(s). In this manner a Christmas tree configured with such ornaments simultaneously functions as a video or computer game system. In further embodiments, multiple players in communication with one another via the Internet or other network may also play such games with one another via the ornament system.

In some other preferred embodiments, the ornamental members 14 could generate different channels on the television network. For example, similar to different television channel information, different data can be sent to the internal screens of the television wherein a plurality of internal screens correspond to a plurality of different transmissions. If information is transmitted, for example, to a set of twenty-four ornaments of this type and outputted to twenty-four different stations from the television, cable or satellite network, a large number of different television stations, cable or satellite station channels would be displayed. Similarly, transmission to different web pages could be exhibited and, in this manner, dynamic web pages could be set up for distribution to Christmas trees through a subscription. In one preferred embodiment, a user, such as family member subscribes to a Christmas tree ornamentation website having a plurality of different web pages that are downloaded to the user's server, either as static web pages or URL addresses that received dynamic data. In this regard, the URLs, which received dynamic data, transmits the received dynamic data to the designated ornaments. Thus, live web cams from around the world, images of Christmas from around the world, different locations around the world, scenery, and the like, could be displayed on the user's Christmas tree in real time, wherein the web pages, which correspond to the live and dynamic web cams, is then transmitted to the user's cams, and/or are then transmitted to the user's home unit for distribution to the various ornaments which correspond to each one of the web pages. In this way, the user's Christmas tree displays a plurality of different Christmas scenes from around the world via the ornaments.

Figure 11:
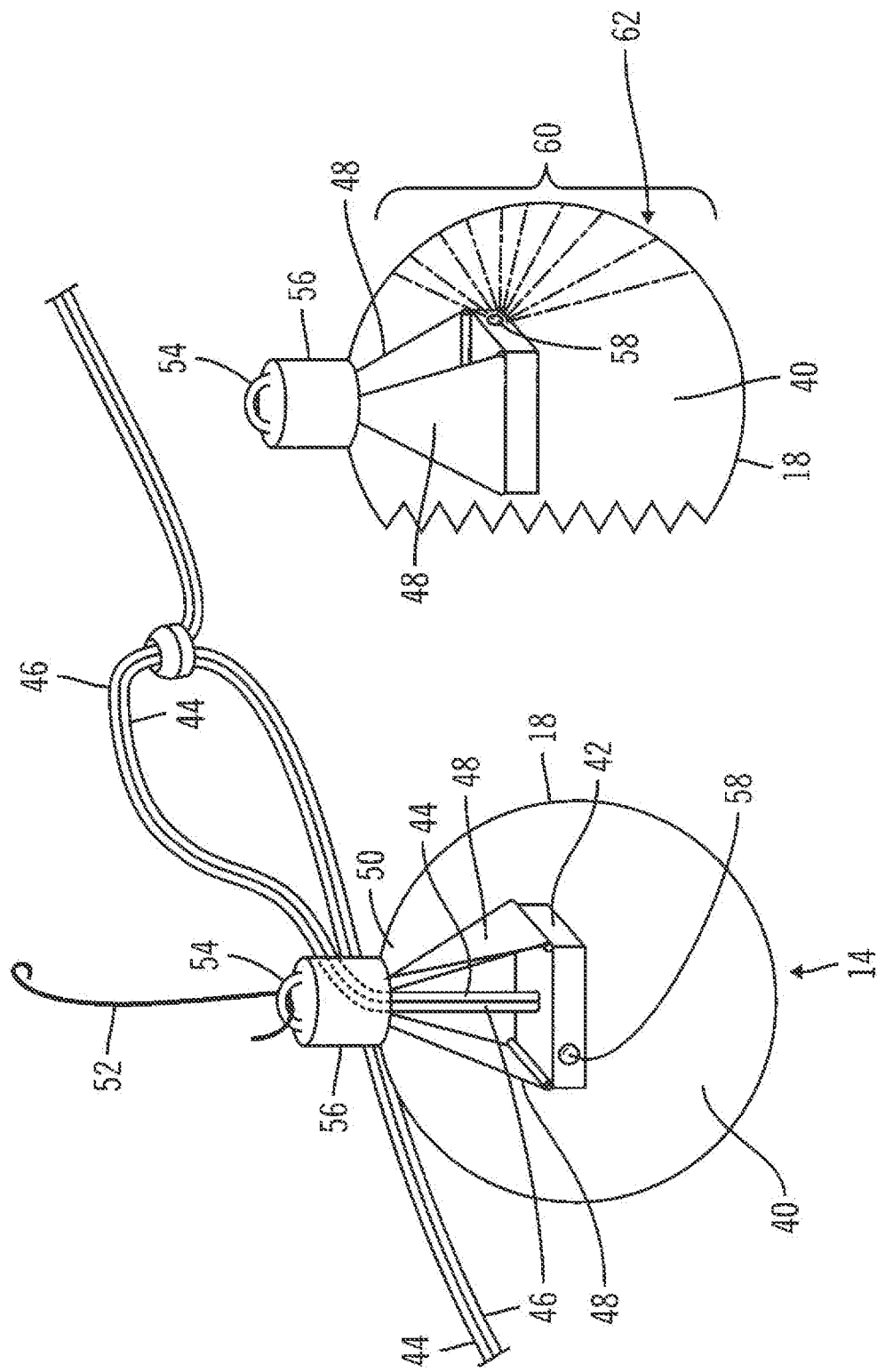

In some preferred embodiments, the display member includes, but is not limited to, one or more projection means, which can include, for example, one or more projectors, as well as other devices capable of generating a visual image on a surface, through translucent material, through semitransparent material, or a visual image that is otherwise perceptible by a viewer. In some preferred embodiments, one or more projection means is/are configured within the interior of the body of the ornamental member. For example, with reference to FIGS. 11 a-b, ornamental member 14 includes body 18 having defined therein hollow interior 40. One or more projection means 42, such as one or more mini projectors, activated by a power source with power supplied by power wires 44 and in communication with one or more data sources providing input data via a data providing means such as via data wires 46, or by wireless means to a wireless data receiver in communication with the one or more projection means 42, may be coupled to, or configured to hang via one or more suspenders 48 from a portion of, interior 40 of body 18, or be otherwise attached to a portion of interior 40 of body 18, for example, by suspenders 48 adjacent the top 50 of ornamental member 14 from which the ornamental member is traditionally hung from a Christmas tree, using hook 52 attached to hook eye 54 which in turn is secured to neck 56 of body 18. The data source can be, for example, one or more internally-mounted processors, one or more externally-mounted processors, or one or more external processors (e.g., one or more processors disposed on, within, or in the vicinity of an artificial tree from which the ornamental member is hung), a video player, a CD player, a network server, a toy, a camera, a computer such as a home computer or a remotely located computer (e.g., a computer located in a location other than a home in which ornamental member 14 is located), a greeting card including data stored therein, such as a greeting card configured to include a digital data storage and digital data transmission means, a mobile telecommunication device such as a mobile phone, smart phone or other similar device, or one or more other ornamental members. In some preferred embodiments the data source can be a plurality of data sources. In some preferred embodiments selection of one or more data sources from which data provided to be displayed via the projection means from among a plurality of data sources is selectable by the user, via, for example, a computer, a mobile phone, a remote control, an ornamental member configured with a touch screen display and selection processing means, or any similar device capable of providing the means to display data source selection options and a means of transmitting such section to the ornamental member or ornamental system with which the ornamental member is in wired or wireless communication directly or through one or more intermediary processors. In some preferred embodiments the selection of one or more data sources from a plurality of data sources is selected by a processor associated with the projection means. In some preferred embodiments the aforesaid processor associated with the projection means providing the selection of data sources from a plurality of data sources providing the data to be displayed via the projection means, provides such selection in a manner to coordinate content displayed on one or more ornamental members. It is to be understood that similar means of providing data and selecting from a plurality of data sources for an ornamental member's display means may be used for an ornamental member display means that is not a projection display means, and that the foregoing description of such means of providing data and selecting data is not intended to be limited to display means comprising projection display means, but can be used for all other types of display means set forth in this disclosure, alone or in combination, including in combination with projection display means.

Ornamental member 14 can be hung, such that light emitter(s) 58 (including, e.g., lenses and/or other illuminating and/or focusing elements) of projection means 42 is (are) centered within interior 40 of body 18 or otherwise configured to allow light emissions from projection means 42 to illuminate an opaque, semi-transparent, transparent or otherwise translucent display portion 60 of body 18 such that the display thereby produced enables a person to view input data, such as still or moving images 62, or alternatively text or graphic data, on or outside of the ornamental member, such as through such one or more such opaque, semi-transparent, transparent or otherwise translucent display portions, and/or, in some preferred embodiments, through one or more portions that function as lenses in order to enlarge at least a portion of images 62. In some preferred embodiments projected images are projected through one or more transparent display portions on to a wall or a ceiling in the room where the ornamental member is located. In some other preferred embodiments the ornamental member's display means may be a combination of display means in a single ornamental member, such as where projection means 42 is combined with one or more displays disposed upon or imbedded in the body of the ornamental member. In some preferred embodiments, one or more projectors comprise laser projectors. In some preferred embodiments, one or more projectors project images of stars or other celestial images on the ceiling and/or one or more walls of the room in which one or more ornamental members so configured is/are located. In some preferred embodiments one or more projectors are controllably moveable via mechanical or electromagnetic means. In some preferred embodiments such movable projectors can project moving stars and/or other celestial images. In some preferred embodiments, such projections of stars and/or other celestial images are effectuated by laser projectors associated with filters configured to diffuse laser light. In some preferred embodiments, such filters are configured to produce diffused laser light through one or more transparent display portions of body 18 to project the appearance of stars, planets and/or nebulae on one or more walls and/or ceilings adjacent to the Christmas tree. In some preferred embodiments such filters are rotatable to provide the effect of moving stars, planets and/or nebulae projected on one or more walls and/or ceilings.

Display portion 60, in some preferred embodiments, is formed upon, disposed upon, secured to, secured within, or integral with the remainder of body 18. In some preferred embodiments display portion 60 of body 18 is white plastic, or other suitable material, that is thin enough or otherwise sufficiently translucent to allow the image(s) 62 projected by projection means 42 from interior 40 of body 18 to be transmitted through the materials and viewed on the outside of body 18 of the ornamental member 14. In other preferred embodiments the portion of body 18 comprising display portion 60 is clear glass or plastic that has a thin layer of paint or other coating on some or all of its surface that allows the image(s) 62 projected from within ornamental member 14 to be viewed thereupon. In still other preferred embodiments, display portion 60 comprises one or more layers of transparent or semi-transparent materials and one or more layers of colored materials,
such as a thin white or other colored film, that is disposed upon or between one or more clear layers to create a screen that enables the viewer to see the image(s) 62 projected by projection means 42 inside the hollow interior 40 of ornamental member 14.

In some preferred embodiments, one or more such projectors reside in the interior 40 of a hollow ornamental member. In some preferred embodiments, projection means 42 are mounted on supports coupled to the interior 40 of ornamental member 14, such as for example, the internal bottom or internal side or sides of body 18.

In some preferred embodiments the projection means is mounted on the inside surface of the body and images are projected onto one or more mirrors or micromirrors mounted within the hollow interior of the ornament or otherwise affixed to a portion of the interior surface of the body whereby the images projected onto such mirror or mirrors are reflected on or through the opaque, semitransparent or transparent portion or portions of the body. In some preferred embodiments the mirror or mirrors are controllably movable by mechanical or electromagnetic means in response to control information provided by a controller.

Figure 12:
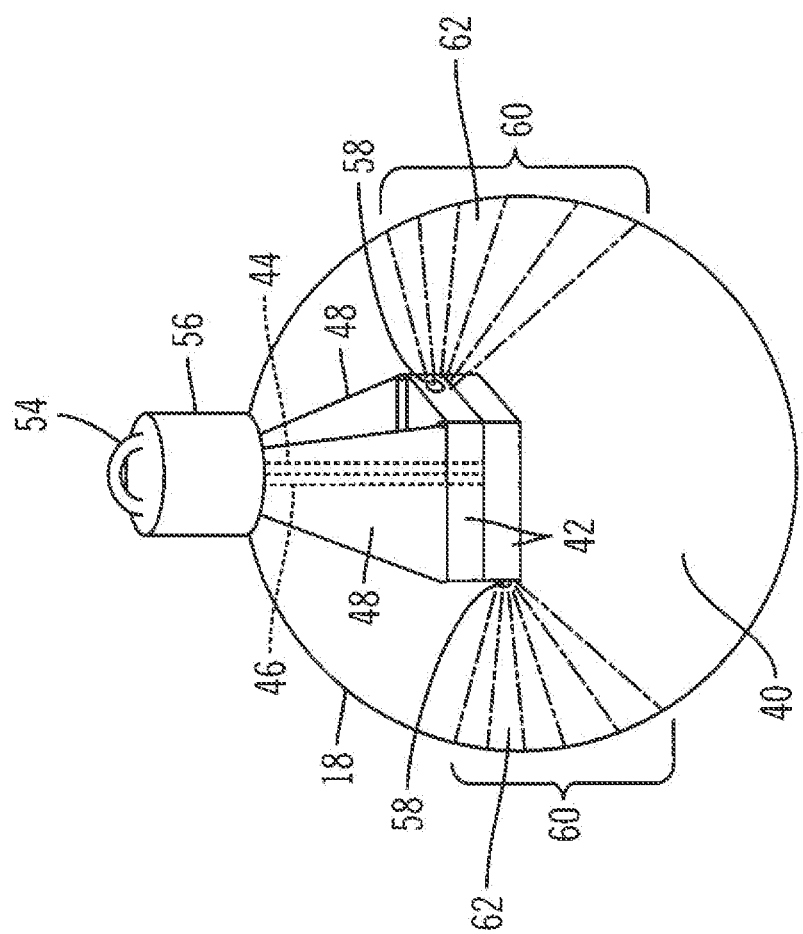
FIG. 12 depicts an ornamental member within which two projectors are disposed in accordance with another preferred embodiment of the invention.

With reference to FIG. 12, in some preferred embodiments two projection means 42, similarly suspended from suspenders 48, may be configured to face in opposite directions in an ornamental member 14, such as a generally spherical ornament 64, such that the emitted light from each projection means 42 will project illumination on and through opposite hemispheres of a partially transparent, opaque, semi-transparent, transparent or otherwise translucent display portion 60 of body 18 of such a spherical ornament 64.

In some preferred embodiments projection means 42 is, or is similar to, the small projectors depicted at microvision.com/pico_projector_displayshowitworks.html, that are capable of projecting images onto a large variety of surfaces and shapes, and are sometimes referred to as a Pico Projector Display Engine, at a least one type of which is produced by Microvision, Inc., of Washington.

Figure 13:
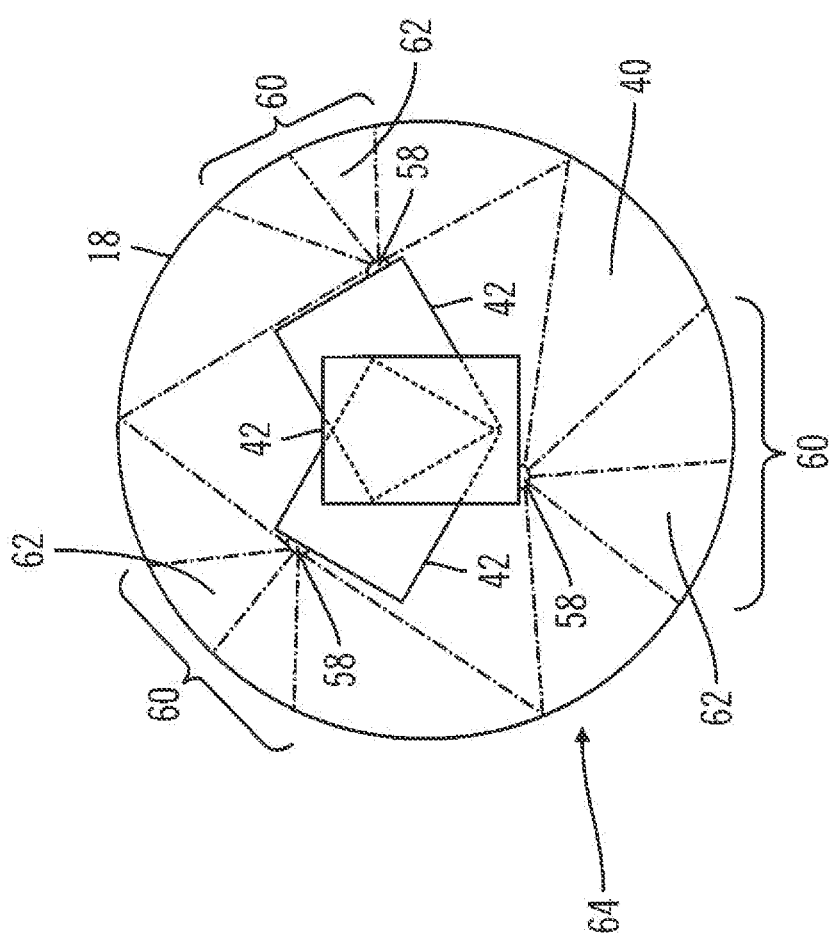
FIG. 13 depicts an ornamental member within which three projectors are disposed within the hollow interior of the ornamental member, the projectors being configured approximately 120 degrees away from each other, in accordance with another preferred embodiment of the invention.

In some preferred embodiments more than two internal projection means 42 are configured to display static or moving images onto at least a portion of the internal surface of an ornamental member, such as a generally spherical ornament, that comprises a partially transparent, opaque, semi-transparent, transparent or otherwise translucent material, thereby allowing for the visibility of such image(s) through such translucent materials. For example, with reference to FIG. 13, three such projection means 42 to project illuminated images 62 onto display portions 60 of body 18 are configured within hollow interior 40 at approximately 120 degrees away from each other, thus affording, in some preferred embodiments, viewing of images around the majority or substantially the entire circumference of generally spherical ornament 64. In some preferred embodiments, content projected by each of the plurality of projection means 42 used to produce viewable images 62 around the majority or substantially the entire circumference or entire body 18 of the ornamental member is coordinated so that the border areas between the projected images 62 are contiguous or substantially contiguous so as to provide the illusion of one contiguous display around the majority or substantially the entire circumference of generally spherical ornament 64. In some preferred embodiments such coordination of displayed visual images, including video content, can, for example, allow the projection of content in a manner that allows for background and/or motion in such content to appear to seamlessly traverse the majority or substantially the entire circumference or surface of the ornamental member. For example, a motion picture projection of a skater on a pond could appear to move around the entirety of the body 18 of the ornamental member. In some preferred embodiments, the seamless or otherwise contiguous display of visual content around an ornamental member, such as a spherical ornamental member, is provided by the coordination of visual content displayed on one or more displays, such as LED displays, disposed on, integrated into or otherwise forming or shaped to form part or substantially all of the body. Further, in some preferred embodiments, such contiguous display of visual content is provided by a combination of such LED displays and the projection of visual content onto display portions 60 of body 18.

In some preferred embodiments, a plurality of projection means 42, such as miniature projectors, are configured and disposed inside the ornamental member in a manner that provides for the projection of coordinated images onto partially transparent, opaque, semi-transparent, transparent or otherwise translucent display portions 60 of body 18 in a manner similar to the circular surrounding projections onto a plurality of adjacent theater projection screens accomplished using the multi-projector technique known as Circle-Vision 360° employed by The Walt Disney Company in its Circle-Vision Theater in Disneyland®. Using this technique of coordinated content display allows a viewer to view on the surface of the ornamental member a projection of content comprising a circular or nearly circular perspective similar to that achieved on the screens of the Circle-Vision Theater in Disneyland®. In some preferred embodiments the arrangement of the plurality of projectors required to achieve this effect are arrayed in a manner similar to the arrangement of projectors in the Circle-Vision Theater in Disneyland®. For example, in some preferred embodiments each projector mounted inside the hollow body of an ornamental member is configured to project across the hollow interior of the body to a specific projection "screen", i.e., a specific partially transparent, opaque, semi-transparent, transparent or otherwise translucent projection segment portion of the body, that is uniquely associated with the projector. In some preferred embodiments the arrangement of the plurality of projectors required to achieve this effect are arrayed adjacent to one another in a radial fashion in or around the center of a spherical or generally spherical ornamental member, whereby each projector is configured to project from in or around the center of a spherical or general spherical ornamental member to a specific projection "screen", i.e., a specific partially transparent, opaque, semi-transparent, transparent or otherwise translucent projection segment portion of the body, that is uniquely associated with the projector. In some preferred embodiments, projections of visual content on partially transparent, opaque, semi-transparent, transparent or otherwise translucent portions of the body is effectuated by projections from projection means that combine radial projection and the technique used in the Circle-Vision Theater.

Figure 14:
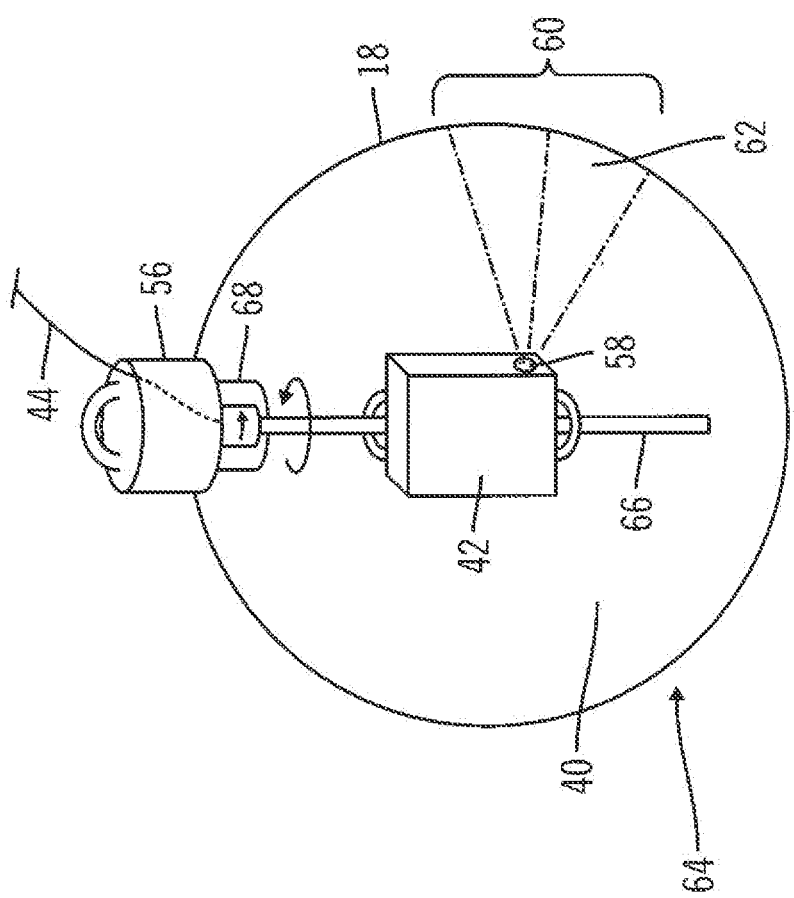
FIG. 14 depicts an ornamental member within which a projector is disposed, the projector being configured around a rigid support that extends through the hollow interior of the ornamental member, in accordance with a preferred embodiment of the invention.

With reference to FIG. 14, in some preferred embodiments one or more projection means 42 can be configured around a support, for example a rigid support such as pole member 66 that extends through hollow interior 40 of body 18, for example axially through the center of a generally spherical ornament 64. In some preferred embodiments motor 68 (supplied with power, for example, via power wire 44 and in some preferred embodiments also in communication with a data source via data wire 46 (FIGS. 15a-b)) drives pole member 66 with attached projection means 42, thereby enabling projection means 42 to be rotated so that one or more projected images 62 might appear to move around the body of the ornament. It is to be understood that in some preferred embodiments one or more projectors can be movable and can be moved by any mechanical, electromagnetic or other means.

Figure 15B:
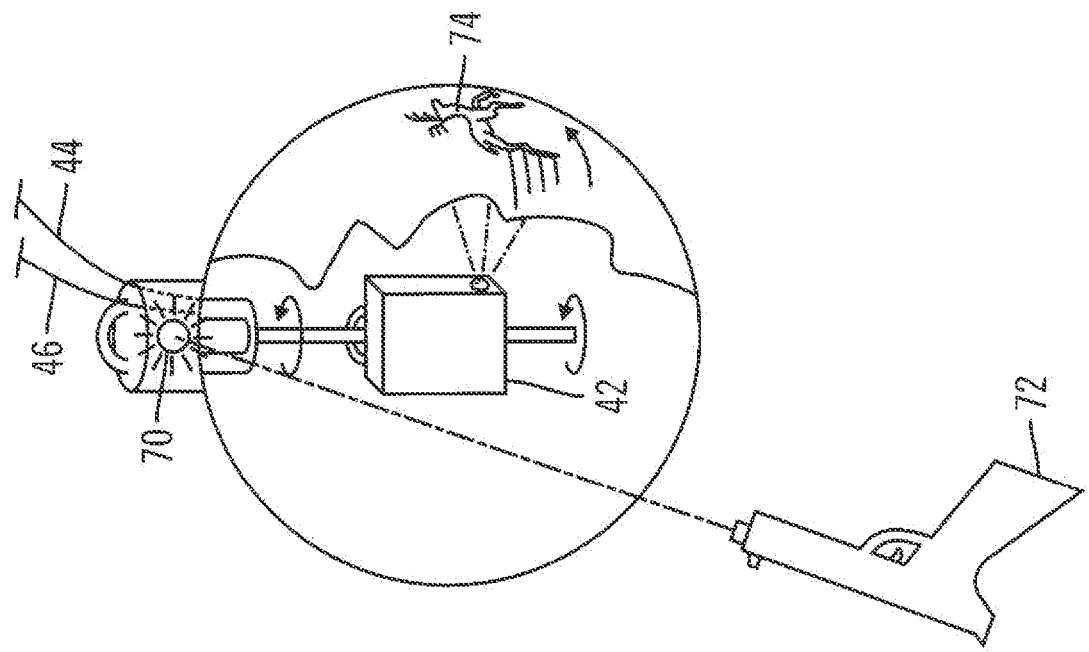
FIGS. 15*a-b* depict an ornamental member as in FIG. 14 with a rotatable rigid support, the rotation of which is controlled by an external source in association with the playing of a game, in accordance with another preferred embodiment of the invention.
Figure 15A:
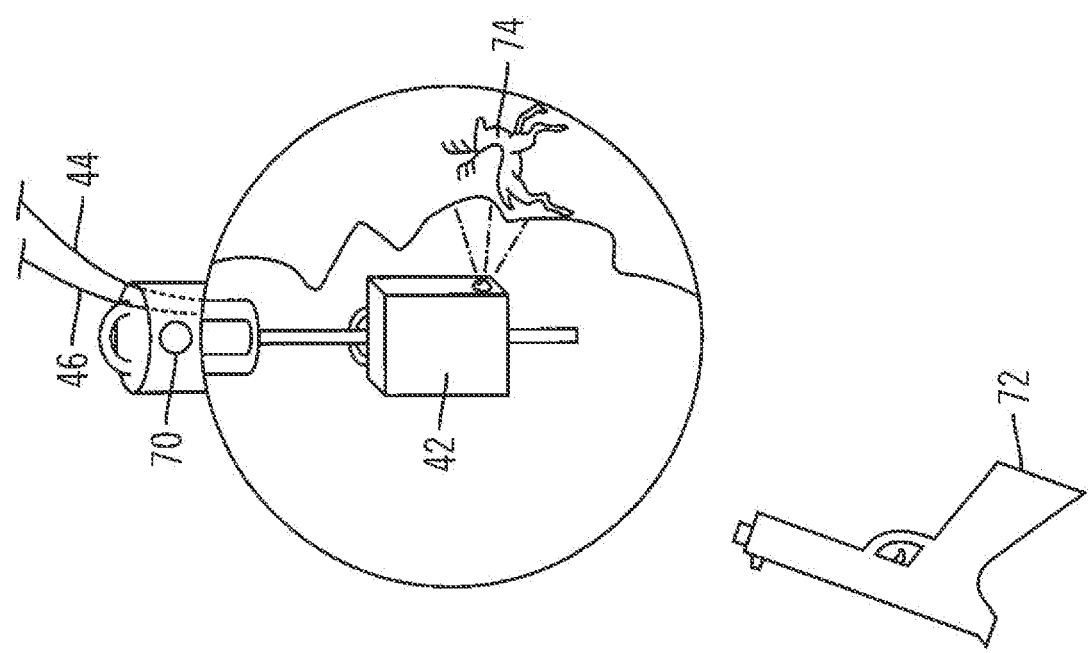

In some preferred embodiments the rotation of the aforesaid pole member 66 may be controlled by an external source via radio or wired means, or by information that has been sent to the ornamental member. With reference to FIGS. 15a-b, in some preferred embodiments, such external control could be in association with the playing of a game whereby ornamental member 14 includes a light sensor 70 responsive to a light emitting gun 72 and connected to power wire 44 and data wire 46. In some preferred embodiments, such as where a target image 74 in a shooting game is, for example, an animated image of an animal moving from one ornamental member 14 to another, and such target image is hit, thereby activating light sensor 70, motor 88, in response to the activation of light sensor 70, rotates pole member 66 causing target image 74 to appear to spin around the ornamental member.

In other preferred embodiments, if the target image 74 displayed is, for example, a pie pan suspended by a string, a successful shot from a light-emitting gun 72 sensed by light sensor 70 triggers motor 68 to rotate pole member 66 to make the target image 74 appear to spin in response to the shot successfully hitting the displayed target image.

With reference to FIG. 16, in some preferred embodiments, one or more non-projector display units 76, such as LCD display units 78, may be attached to pole member 66 (whether fixed or rotatable). In these embodiments, if body 18 of ornamental member 14 is substantially transparent, LCD display unit 78 is more readily viewable by a user.

In some preferred embodiments, a combination of projection means 42 and non-projector display units 76 may be configured within hollow interior 40 of body 18.

In some preferred embodiments a combination of display means is employed whereby at least a portion or substantially all of the body comprises a display and one or more portions of the body not comprising such display, comprise one or more transparent windows through which one or more display units 76 may be viewed, and/or one or more translucent portions of the body onto which projection means 42 projects images.

Figure 17:
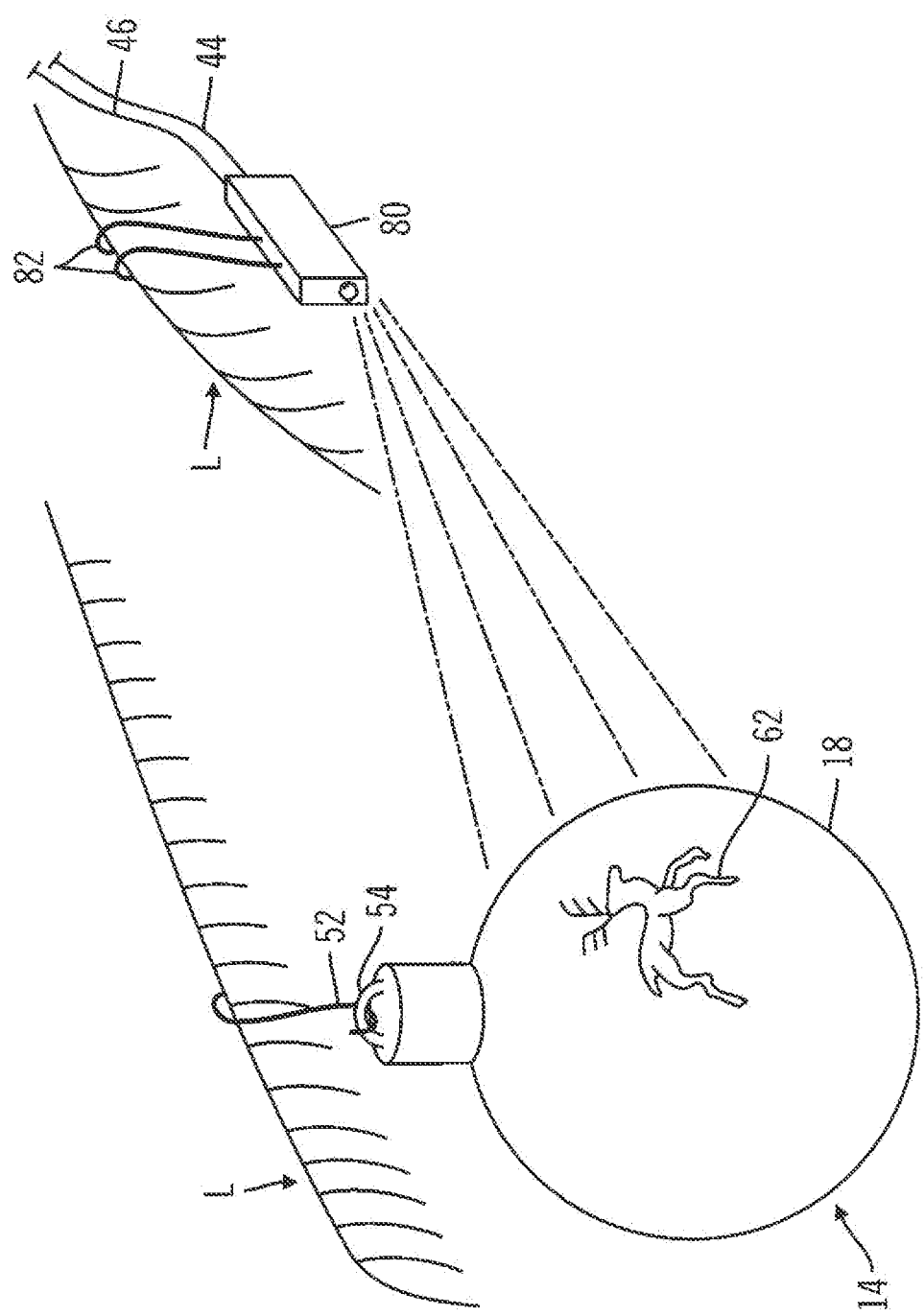
FIG. 17 depicts an ornamental member onto which display data are projected from remotely located projection means in accordance with a preferred embodiment of the invention.

In other preferred embodiments, projection means are remotely located from the ornamental member and project display data onto the surface of the body of the ornamental member from the remote location. For example, and with reference to FIG. 17, in some preferred embodiments, remote projection means 80 are attached via one or more hooks 82 to a limb L of a Christmas tree or an artificial Christmas tree (which can be the same limb or a different limb) adjacent ornamental member 14 or proximally located to the ornamental member, wherein remote projection means 80 are positioned and configured to project image 62 onto body 18 of ornamental member 14. In some preferred embodiments the place to hang the ornamental member on the tree is pre-designated so that properly configured remote projection means 80 projects image 62 onto body 18 of ornamental member 14. In some of these embodiments, some artificial Christmas trees are configured to indicate where remote projection means 80 and ornamental members 14 are to be placed in order to ease the use of such systems.

In some preferred embodiment, one or more ornamental members 14 incorporate rechargeable batteries or rechargeable elements capable of being wirelessly recharged. Wireless recharging technologies include, for example, wireless plastic pads (as described, for example, at http://thomasnet.com/articles/plastics-rubber/wireless-power-pads), such as the Power Pad™ technology developed by MobileWise (as described, for example, at http://www.nowpublic.com/tech-biz/power-pad-offers-easy-recharge-devices-no-wires). In some preferred embodiments, emitting elements of the selected wireless recharging technology can be incorporated in an artificial Christmas tree, such as in a trunk or one or more limbs L thereof, and one or more ornamental members 14 are disposed adjacent such emitting elements at a distance sufficient to enable wireless recharging. In other preferred embodiments, one or more emitting ornamental members can be configured to incorporate emitting elements of the selected wireless recharging technology, and other ornamental elements incorporating batteries or rechargeable elements are disposed adjacent such emitting ornamental members at a distance sufficient to enable wireless recharging. In still other preferred embodiments, emitting members of the selected wireless recharging technology are incorporated into light strings or other elements disposed on a Christmas tree. In yet other preferred embodiments, a pad incorporating emitting members of the selected wireless recharging technology is disposed beneath a Christmas tree on which one or more ornamental members incorporating batteries or rechargeable elements are disposed.

Figure 18:
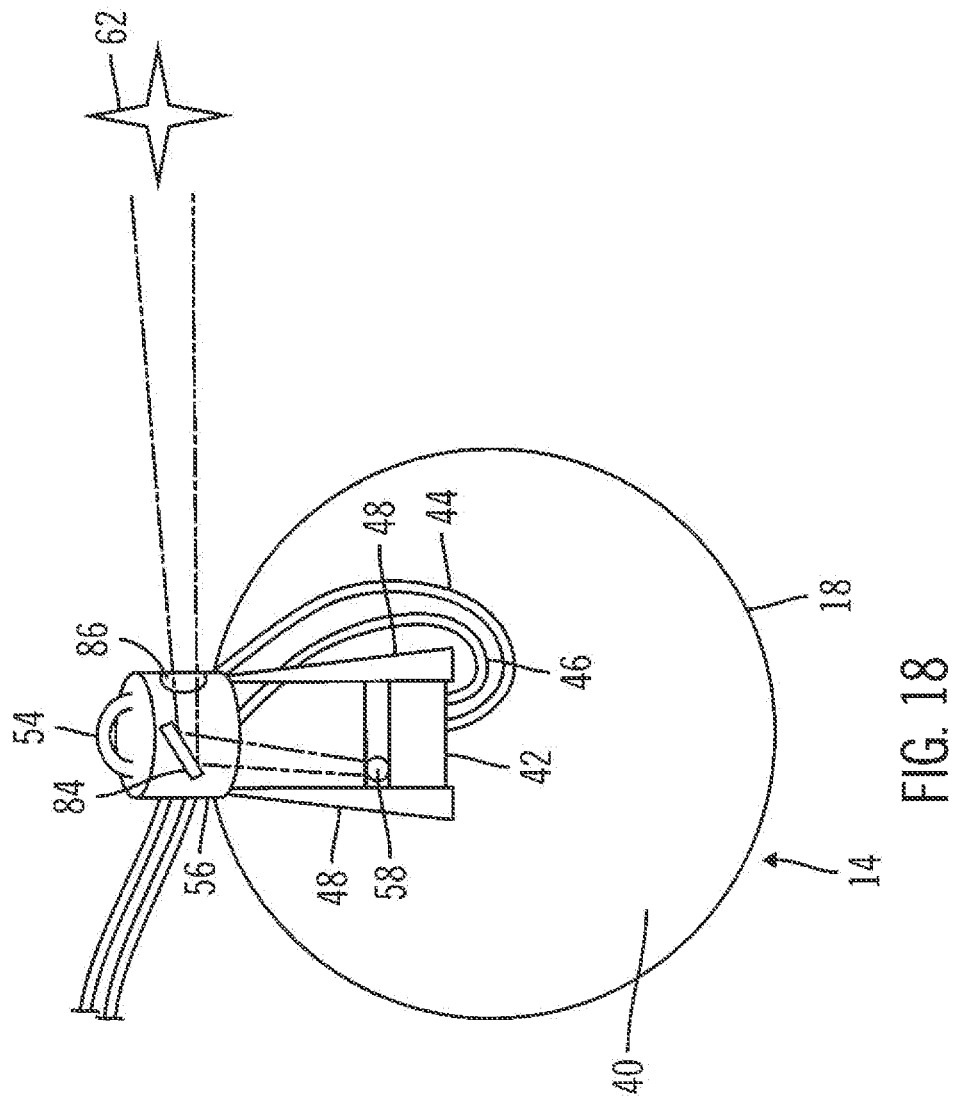
FIG. 18 depicts an ornamental member including projection means configured to project content by means of a mirror mounted within the neck of the ornamental member, in accordance with another preferred embodiment of the invention.

In some preferred embodiments, ornamental members are interactive and are configured with projection means 42 such as a micro projector of the type produced by Microvision, as discussed above. In some preferred embodiments, the micro projector is configured to project from neck 56 or another part of body 18 of ornamental member 14. In some preferred embodiments, projection is accomplished with the use of mirror 84 disposed in neck 56 (FIG. 18) or another part of body 18 of ornamental member 14, which reflects projected image 62 through aperture 86 or, in some preferred embodiments, through a transparent or translucent portion of body 18. In some preferred embodiments, content is projected onto other ornaments, into the room containing the Christmas tree, onto a surface within the room containing the Christmas tree, into an adjacent room, or out a window. For example, in some preferred embodiments, projection means 42 of ornamental member 14 project a starry dome into the room. In some preferred embodiments, such projection means produce a projection of snow falling. In some preferred embodiments, such projection means produce a holographic effect by projecting onto and/or into other ornamental members or a properly prepared substance to create a holographic effect. In some preferred embodiments, through the use of smoke or means to produce a holographic image, an effect similar to that depicted in the story of Star Wars®, in which a holographic projection by the robot R2-D2 created an image of Princess Leia, is produced. In some preferred embodiments the projection means produces the holographic effect inside an interactive ornamental member as described herein. In some preferred embodiments, such projections are coordinated with other special effects produced by one or more ornamental members, such as the emission of smoke, confetti, Silly String®, etc.

In some preferred embodiments in response to a signal transmitted to an ornamental member, which is received by a sensor coupled to the ornamental member, the ornamental member can be triggered either to display content stored in its on-board memory, perform a pre-programmed effect (e.g., release confetti, coordinated movement of two or more ornamental members or components thereof, etc.), or fetch information or instructions from an external computer, such as a system computer, a home computer or a computer on a network such as the Internet, as well as from any other telecommunication or data transmission device, including without limitation cellular telephones, i-Pod Touch® devices, i-Phones®, Blackberries®, etc., or from a greeting card configured with a computer or from another ornamental member. In some preferred embodiments such instructions can be control data to regulate the display of content or instructions for how to display the content on the ornamental member in relation to other ornamental members. In some preferred embodiments the information retrieved may be instructions regarding the performance of a special effect, or instructions or content information to be transmitted to one or more other ornamental members.

In some preferred embodiments the signal controlling the ornamental member is produced by the central processor in response to a signal received by the central processor configured to receive the signal from an external computer, such as a system computer, home computer or a computer on a network such as the Internet, as well as from any other telecommunication or data transmission device, including without limitation cellular telephones, i-Pod Touch® devices, i-Phones®, Blackberries®, etc., or from a greeting card configured with a computer, or from another ornamental member.

In some preferred embodiments, one or more ornamental members comprising the ornamental system can control other ornamental members or external devices configured to receive control information from one or more ornamental members or the central processor. In instances wherein the control information is transmitted from another ornamental member, the transmitting ornamental member further comprises an internal processor configured to transmit data or information, such as, control information.

Figure 19:
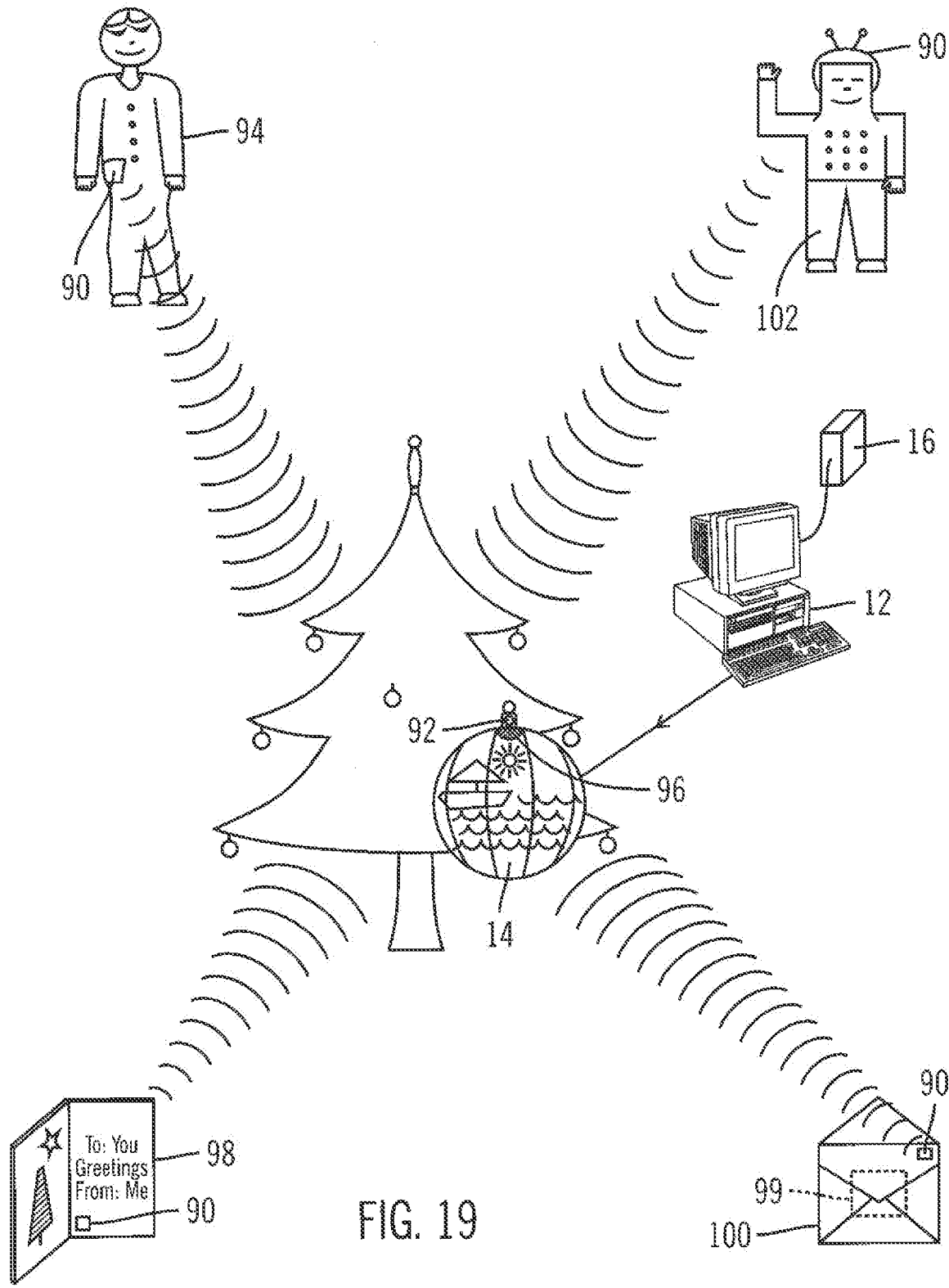
FIG. 19 depicts an ornamental member that senses signals emitted from various signal emitting devices in accordance with a preferred embodiment of the invention.

With reference to FIG. 19, in some preferred embodiments, the signal to be sensed by the receiving member of the ornamental member can be that which is emitted by a signal emitting device, such as a tag, such as a radio frequency identification (RFID) tag 90. In some preferred embodiments of the ornamental system one or more ornamental members and/or the central processor is configured with a proximity sensor 92 to detect the signal produced by a signal emitting tag. An RFID tag signaling system can enable a user, for example, to affix such a RAD to a child's clothing, such as pajamas 94. In this way embodiments of the ornamental system programmed to respond to the signal emitted by the tag affixed to the child's clothing could display pre-programmed content or special effect performances by one or more ornamental members as a greeting to the child (e.g., the playing of an audio, video or audio-visual program of "Merry Christmas Johnny!" through a speaker, such as ornament speaker 96) who comes within the vicinity of an ornamental member. Similarly, the ornamental system could be programmed to admonish the child to return to bed (e.g., with a recording of Santa's voice performed by the ornamental system) if the child is in the vicinity of the ornamental system at a time when he or she should instead be in bed sleeping. For example, the ornamental system could be programmed such that when a child with a RFID tag affixed to his or her clothing approached a Christmas tree decorated with the ornamental system at an inappropriate hour (e.g., 1:00 a.m.), the Christmas ornamental members pertaining to the instant system could coordinate one or more actions, including content display or performance by a number of ornaments, such as to light up and deliver a message, such as, for example, a message purportedly from Santa Claus very kindly communicating through one or more ornamental members, "You'd better go back upstairs because Santa Claus is coming," and then start playing a program such as the song "Jingle Bells". In contrast, for example, when a child wearing an RFID recognizable by the ornamental system approaches the Christmas tree decorated with the ornamental system at what a parent might deem to be a more appropriate hour (e.g., 9 am on Christmas Day) one or more ornamental members on the Christmas tree could be programmed to say "Good Morning, look what Santa Claus brought you last night!" or "Merry Christmas!", etc. In some preferred embodiments, for example, the ornamental members on the tree, in response to the tag's transmission, might start playing music such as Christmas carols, light up, and/or, in conjunction with the ornamental members communicating with each other, independently or through the central processor, start exhibiting content, such as swirling and twirling effects, as well as causing other predefined events to occur, such as, for example, transmitting a signal to turn on Christmas tree light strings, activate or control toys or functions configured to receive and respond to such activation or control signals, etc. In some preferred embodiments, one or more radio tags could be associated with different packages, and in still other preferred embodiments, radio tag signals could be associated with pre-recorded content which has been pre-programmed into the ornamental system by parents or others to guide the child to unwrapping gifts in particular sequence. For example, upon receipt of a signal by a particular RFID, an ornamental member could play an auditory announcement, such as, "please open the one with the blue and white star wrapping on it". In some preferred embodiments the tag could be associated with a motion detector system affixed to one or more packages to provide motion information to the ornamental system so that if the child starts to move the wrong package, upon receipt of a signal from the motion detector system affixed to the package, one or more ornamental members could play a pre-recorded message directing the child's package selection, such as for example, "not that one, not that one . . . " until the right package is moved and then the system could announce, "Yes, that's the one!"

In some preferred embodiments the ornamental members can respond to signals generated by RFID tags or other signal generating means associated with greeting cards or gifts cards. With respect to FIG. 19, for example, a gift card 99 from a department or specialty store, for example, can be made available to purchasers with an option to affix thereto an RFID tag 90 or other signal generating means, such as signal generating means that would be triggered by a reed switch, microswitch or other means known to trigger such signal generating means. The RFID tag or other signal generating means can be configured to do so when the gift card 99 is removed from an envelope 100 surrounding such card, tag and, in some embodiments, switch. (Note: although FIG. 19 depicts several modalities for the use of RFID tags and/or signaling systems as discussed above and below for use with the instant invention, it is to be understood that preferred embodiments may include one, all, or a combination of illustrative modalities depicted in FIG. 19.) In the latter types of embodiments, for example, the removal of the gift card from a surrounding envelope or folded card can cause a spring loaded switch affixed to the gift card to activate, much the same way as a recorded program in a musical greeting card is activated, in the instant case such signal activation would, in turn, trigger the transmission of a signal to a nearby ornamental member or other signal receiver in the central processor of the ornamental system. Thus, for example, a gift card so configured, once removed from an envelope or sleeve could send a signal to the ornamental system, which in turn could recognize the signal as a particular type of gift card or a particular individual gift card.

In some preferred embodiments, the central processor configured with a sensor 92 to receive a signal from such an RFID or other signaling system will receive data from the RFID or other signaling system affixed to the gift card 99, such as card type, security information, card number and/or transactional data, directly or via one or more ornamental members in communication therewith. In some preferred embodiments, one or more ornaments configured with a sensor to receive a signal from such an RFID or other signaling system will receive data from the RFID or other signaling system affixed to the gift card. In some preferred embodiments a transaction, authentication or other identification number or other data could be associated with the RFD tag or other signaling device. In some preferred embodiments, an ornamental system connected to the Internet, directly or via one or more intermediary computers, would connect with a server associated with the issuing department store, specialty store or issuing agent associated therewith. Such server could verify the authenticity and amount of the gift card and further provide other data to the ornamental system through the Internet comprising special offers associated with the gift card that could be displayed on one or more ornamental members in the ornamental system. For example, a gift card so configured from, for example "The GAP" might display special offers regarding different clothing items on different ornamental members. In some preferred embodiments, one or more of the ornamental members' screens displays embedded or comprising the body comprise one or more touch screen displays that would allow information to be sent back to the department or specialty store server through touch selection of options on the ornamental member so configured, thus allowing an ornamental member in the instant invention to function as a virtual keypad or data input controller. In this manner, for example, funds available on the gift card could be used to purchase the item(s) so displayed via the ornamental system. In still other embodiments, the data displayed on the display screen of the ornamental member could also be displayed on a computer display, a television screen or mobile telephone screen that has been coupled to the ornamental system for ease of review by the users.

In some preferred embodiments, authentication of gift cards configured to operate with an ornamental system could be accomplished via the use of a camera located in, on, or associated with, an ornamental member, such as in the "neck" of the ornamental member below a traditional hanging means. For example, a video camera could be used to transmit an identification image of the person intended to receive and use the gift card, or that person's identification document, such as a picture identification card, to an authorizing agent at the store or fulfillment house. In other preferred embodiments, the camera could also function to capture and transmit images of universal product code ("UPC") tags or other similar codes on gift cards for transmission to the issuing company or to an appropriate application to read such codes in such images. In this manner, an ornamental member configured with such a camera can act as a quasi-UPC scanner enabling one or more computers receiving the image in communication with the camera or the ornamental member to read a universal product code tag on the back of a gift card to verify authenticity or trigger the retrieval of one or more specific files (e.g., offers, content, etc.) associated with the gift card.

In some preferred embodiments, once the RFID tag or other signaling system is initiated and the ornamental system recognizes the signal transmitted therefrom, the central processor of the ornamental system then communicates with a remote server how many ornamental members comprising the ornamental system are on the tree that have visual displays and, in some preferred embodiments, how such ornamental members are configured in relation to one another on the tree. In some preferred embodiments, information regarding the types of ornamental members is transmitted. In some preferred other detailed information regarding the ornamental members is transmitted, such as the number and types of displays each has, whether and which ones have touch screen displays, etc. In response to this information, a predetermined set of offers from the server can be transmitted to the ornamental members in the ornamental system. In some preferred embodiments, a greeting, such as for example, "Merry Christmas Anna, this is a gift from Greg to you for your use at a GAP store. We look forward to seeing you. If you would like, however, we will display some special offers for you to use your gift card if you want to today." In some preferred embodiments, the recipient of the card could answer 'yes' or 'no' by a selection means such as, for example, by use of the ornamental system's master keyboard controller, via touch screen-enabled ornamental member(s) or the touch screen of a mobile telephone configured to interact with the ornamental system. If the user answers 'yes', in some preferred embodiments, images or video clips of different products are displayed on different ornamental members. In some preferred embodiments, the issuer of the gift card may wish to provide the recipient with enhanced buying power or additional offers if the card is used immediately via the ornamental system. For example, the ornamental system might be instructed to inform the recipient that if the $200 gift card is used during the current day, the issuing company would give the recipient $300 worth of buying power with respect to purchasing items displayed on the ornamental members in the ornamental system.

In other preferred embodiments, other RFID tag or signaling systems can be associated with greeting cards, gifts and other devices, such as, for example, toys, holiday decorations, including performing holiday decorations such as "dancing Santas", etc., and other items commonly found in homes celebrating the holidays, such as plates, glasses, serving platters and other food and beverage containers.

In some preferred embodiments, a greeting card 98 may be configured with a signaling system, which when initiated, such as when it is removed from an envelope or opened up, the central processor of the ornamental system, directly or via one or more ornamental members, in a manner similar to that described above regarding gift cards configured for use with the ornamental system, then retrieves appropriate data files, including those containing control data and display data, such as visual and musical content, to be used in coordination or other association with presentation of the greeting card or its general presence in proximity to the ornamental system. In some preferred embodiments, for example, a greeting card company provider or a consumer provider of a greeting card able to operate with an ornamental system described in the instant invention could choose the musical and/or visual content that would be performed on an ornamental system configured to work in coordination with the card. In this way, if the greeting card is opened in the proximity of such an ornamental system, the system would load the one or more ornamental members individually with appropriate program information desired by the provider to be performed in association with the presentation and opening of the card or program a plurality of ornamental members displayed on a Christmas tree to provide content display and other performances by the ornamental members in coordination with one another. In some preferred embodiments, the content to be displayed on the ornamental member or a plurality of ornamental members and/or the performance(s) to be performed thereon is pre-programmed to be displayed and/or performed with a specific greeting card or a specific type of greeting card. In some preferred embodiments, the audio and/or video content could be content created or selected by the purchaser provider of the card or custom created. In some preferred embodiments, when the card opens up, the RFID tag or other signaling device affixed or associated with the card signals or instructs the ornamental member to retrieve a set of information pre-programmed in the card for one or more of the ornamental members comprising the set of ornamental members displayed on the Christmas tree.

For example, if the greeting card is a Hallmark® greeting card, for example, configured with such a RFID tag or other signaling means able to communicate with the instant ornamental system, once the card emits a signal recognized by an ornamental member or other component of the ornamental system configured to receive such signal, and the ornamental system recognizes the card, the ornamental system is provided with information regarding a URL or other address on the Internet from which to retrieve further information for control of the ornamental system and display of appropriate content thereon in association with the greeting card. In the instant example, the ornamental system accesses the Hallmark server, provides the identifying information it has received from the RFID tag or other signaling device associated with the greeting card regarding the card, such as its product code identifying the type of card it is among the cards produced by Hallmark®. (The RFID tag essentially functions to transmit information to the ornamental system identifying the card as a Hallmark interactive card with for example, a product number such as "123456789" and further instructing the system to connect to a server, for example, at a particular URL, and "wait for further instructions." The remote server next transmits code that essentially inquires of the instant ornamental system the type of system it is, which version of the system it is, how many ornamental members in the ornamental system are configured on the Christmas tree, where and how each ornamental member is oriented in relation to the others, and other information relevant to the display of specialized content associated with the greeting card. The remote server then transmits the proper control information and content for the types of ornamental members and configuration of the ornaments as indicated by the ornamental system.

In some preferred embodiments a musical greeting card or a greeting card with video display capability configured with an RFID or other signaling device to enable interaction with the instant ornamental system can be configured to interact with content displayed or performed via the ornamental system. For example, music played on the musical greeting card can be coordinated with music, visual information or other content displayed or performed on the instant ornamental system.

In some preferred embodiments the ornamental system and/or one or more ornamental members are configured to respond to enhanced RFID's and/or signal transmitting devices capable of transmitting signals over relatively long distances such as distances between a user's mailbox and Christmas tree, such that the delivery or mail box arrival of a greeting card or gift can trigger a display or show via the ornamental system and/or one or more ornamental members.

In some preferred embodiments, the ornamental members in the instant ornamental system are used to display movie trailers, such as trailers for movies that are in first run exhibition in theaters. In some preferred embodiments, the ornamental members in the instant ornamental system are used to perform musical works and/or music videos. In some preferred embodiments, the ornamental members in the instant ornamental system are used to display or perform commercial advertisements and other promotional content.

In some preferred embodiments, content transmitted from the ornamental system can be transmitted to a home entertainment system, instead of, or in addition to, an ornamental member. In some of such embodiments, motion pictures for which trailers are displayed on ornamental members in the instant ornamental system are transmitted via wire or wireless means to the user's home entertainment system (television, music system, etc.) via the ornamental system in response to a request for such motion picture content ordered through the ornamental members via a touch screen enabled ornamental member or another means of controlling the ornamental system to provide such requests to providers of such motion picture content. In some of such preferred embodiments, such motion picture content is purchased for such display on the user's home entertainment system via the instant ornamental system. In some preferred embodiments, music content and music video content can be promoted and sold through such use of the ornamental system.

In some preferred embodiments, a mechanism, such as a remote control device, controlling a child's toy or other device that is responsive to external wireless control can be used to control such a toy or other device by the instant ornamental system to facilitate coordination of the toy or other device with content displayed via the ornamental system. In some preferred embodiments the ornamental system and/or one or more ornamental members include a means for transmitting radio waves that can be used in signaling systems such as, for example, as previously discussed, signaling systems used in
association with radio frequency identification devices, or so-called RFID tags or other similar devices. Such RFIDs can be used in association with controlling means activated and/or controlled by signals received through or in association with the use of such RFIDs or similar devices. For example, in some preferred embodiments, a toy robot 102 that includes such a wireless controlling means is able to be controlled and/or coordinated by or with the ornamental system or one or more individual ornamental members configured with the means to transmit such control information. In some preferred embodiments, one or more signals generated by the ornamental system and/or one or more ornamental members are used to cause the robot to produce a reaction to a child that comes within the proximity of the ornamental system or one or more of the ornaments of the instant ornamental system, such as when the child wearing an RFID tag 90 on his or her pajamas 94, approaches a Christmas tree adorned with such ornaments on Christmas morning. In some examples of this type of embodiment, one or more ornaments, or another component of an ornamental system, transmit an energizing and/or triggering emission of radio waves received by the RFID in the child's clothing, which, in turn, causes the RFID to transmit a signal that is received by the ornamental system and/or one or more ornamental members configured to receive such signals. The signals so received then trigger one or more processors in the ornamental system and/or one or more ornamental members. Once the processors in the ornamental system and/or ornamental members are so triggered, one or more ornamental members display content or perform one or more other functions, such as coordinated display. In some embodiments the content is retrieved from an external source, such as a remote server connected to the ornamental system and/or one or more ornaments via the Internet. In some preferred embodiments performance instructions is retrieved from an external source. For example, such an action might trigger both a greeting to the child such as "Good Morning Bobby, Merry Christmas" transmitted by an ornamental member and an action by the robot, such as a greeting (raising an arm, etc.).

The ornamental members in the instant ornamental system can directly receive information and/or signals transmitted from a system central processor. The ornamental members can, in other preferred embodiments, receive information and/or signals indirectly, such as from a remote computer via the system central processor. The ornamental members, in other preferred embodiments, can receive information and/or signals directly from a remote computer, an external device, or other ornamental members. In some preferred embodiments, ornamental members are configured to receive information and convey it to the central processor or other ornamental members. In some preferred embodiments, the ornamental system is capable of receiving digital data from outside the ornamental system, such as from a remote computer via the Internet. That data can comprise the content to be displayed on one or more ornamental members and/or provide control and/or performance instructions and/or other data to coordinate the actions of one or more ornamental members and/or the performance(s) of special effects, such as the generation of smoke, the expulsion of confetti or gas to generate an effects, such as for example, fog or a freezing effect.

In some preferred embodiments the central processor can transmit and receive control information to or from external devices such as toys enabled to send and receive such control information. In some preferred embodiments where the relative locations of one or more ornamental members configured with a special effect, such as a laser or light beam emitter are established in relation to a toy or other external device configured to communicate with the instant ornamental system, location specific effects can be performed by one or more such configured ornamental members and external devices, such as the shooting of a laser beams at a toy robot configured to reveal its location in relation to the ornamental member (via GPS or other locational means). In some preferred embodiments, the locations of external devices could be supplied or programmed into the ornamental system by the user or supplied to the ornamental system by the toy or other device itself.

In some preferred embodiments, the ornamental system further comprises a visual display and control means for assigning of content or performance characteristics to each of the ornamental members on the tree. In these embodiments, the user utilizes a monitor, such as a computer screen, the screen of a telephone, a heads up display, a projection means or other means that allows the user to identify the content and/or performance
instructions assigned to each ornamental member in the ornamental system, and further allows the user to change the assignments. In these embodiments, the user can identify, for example, by number or some other identification means, each ornamental member intended to be used on the tree. Each ornamental member is then assigned content, including, but not limited to, image data, auditory, motion and video graphic data. In some preferred embodiments, the visual display means also displays the relative or exact placement and orientation of the ornamental members on the Christmas tree. In other preferred embodiments one or more ornamental members communicate locational information regarding the location and/or orientation of the ornamental member(s) with the central processor providing the information to the aforesaid display for the user. In some preferred embodiments, the ornamental system includes software for use on a home computer and/or mobile device which allows for the displaying on a computer and/or mobile device display screen a Christmas tree in diagrammatic form, and which further allows the user to place a plurality of ornament icons uniquely corresponding to actual ornamental members in the ornamental system on the displayed diagram in relative position to one another on the actual Christmas tree. In some preferred embodiments, this function provides the user with the ability to assign content and/or performance instructions to the various ornamental members in a desired manner.

In some preferred embodiments, the ornamental member's locational and/or orientational information provided to the central processor is obtained by the subject ornament(s) via GPS receivers or signal triangulation means, for example via a GPS receiver integrated into the subject ornamental member(s) capable of providing locational information to the central processor and/or other ornamental members or similar ornamental systems.

In some preferred embodiments, the ornamental system includes a plurality of signal generating devices, including, but not limited to, radio signal generating devices, light signal generating devices, including infrared light signal generating devices, and sound signal generating devices. In some preferred embodiments, the ornamental system includes at least three (3) signal generating devices. The signal generating devices are capable of
producing a signal that allows the user to configure the signal generating devices around a Christmas tree on which ornamental members used by the ornamental system are hung. In such embodiments, a triangulation pattern is established that would allow the ornamental members to receive signals from the signal generating devices arrayed around the tree at the ornamental members' respective locations and then report the information regarding the ornamental member's identity and its receipt of the signals to the central processor to calculate and determine where in physical space each ornamental member is on the Christmas tree in relation to one another.

In some preferred embodiments, if the Christmas tree is an artificial Christmas tree, the artificial tree can be configured to allow the user to place the ornamental members in particular places on the tree corresponding to predefined locations, or code in the memory or programmable into the central processor, such that an ornamental member hung at a particular predefined location would be assigned that location by the central processor and would therefore have a particular location in the overall ornamental system for purposes of receiving information for coordinated display of content and performances in relation with other ornamental members or external devices.

In some preferred embodiments, the visual display allows the user to decorate a simulated tree displayed on the visual display with the choice of content, such as video and audio content and/or performances, such as confetti or simulated smoke release by particular ornamental members chosen by the user. In some preferred embodiments, the content and/or performance data selectable for each ornamental member is supplied by the provider of the ornamental system. In some preferred embodiments, the content and/or performance data selectable for each ornamental member is supplied by a third-party provider, such as Disney®, Warner Brothers®, or Hallmark® via a storage device that provides information regarding such content and performance data to the central processor (e.g. a DVD, USB storage device, flash memory, etc.). In still other preferred embodiments, such content and performance information is provided by third-party providers via the Internet or other network data transmission means. In other preferred embodiments such content and performance data is provided by the user. In other preferred embodiments such content and performance data is provided by an external device, such as an electronic greeting card, gift card, toy or mobile phone in communication with the central processor the user.

In some preferred embodiments a pre-selected assortment for the number of ornamental members to be used on the Christmas tree is made available from a database. In some preferred embodiments the database is provided with a set of ornamental members from the provider, and/or the set of ornamental members can be selected from choice of ornamental member sets from a vender via a web site or other online means. For example, in this manner the user could select from among a selection of content and performances for the user's ornamental members that could be a Disney® set, a Warner Brothers® cartoon set, a or Hallmark® set, or even a set that is a copy of a set designed or in current use by a celebrity, such a Madonna, or a set that is a copy of the set in use by a governmental official, such as a set on a Christmas Tree in the White House or at 10 Downing Street.

In some preferred embodiments, individual ornaments can be programmed to display audio and video content in a manner corresponding to individual musical instruments and/or characters. In this way, the ornamental members in such a configured ornamental system can perform programmatic music, such as "Peter and the Wolf" where each instrument/character is displayed on a separate ornamental member.

In some preferred embodiments, such as where the powering means for an ornamental member is effectuated via plugging into a nearby power socket on a string of power sockets, some or each socket can be assigned a known linear or other special or sequential orientation to the other sockets, or otherwise in regard to its location on the string, that is communicated to the central processor and/or to one or more ornaments. For example, each socket on such a string of sockets could have a number or electronic identifier associated with it. In some preferred embodiments, such socket strings are configured such that the identification of sockets in use to power an ornamental member is reported to the central processor. In some preferred embodiments, such socket use information is augmented with additional identifying information regarding the ornamental
member that is using such socket, such as type, capabilities, current content and/or performance control data information regarding the content and/or performance associated with the ornamental member, in some preferred embodiments, such information is transmitted by the ornamental member plugged into the socket to the central processor via a socket and/or the socket string connected to the central processor. In some preferred embodiments the connection to the central processor is by wireless means. In some preferred embodiments such information is transmitted to processors in external devices such as toys, greeting cards, gift cards, external computers, etc., or to other ornamental members. For example, an ornamental system so configured would be able to provide to the central processor information regarding the relative positions and orientations of each ornamental member in the system to better enable the user to program each ornamental member with the content and performance characteristics desired for aesthetic reasons and for effective coordinated performance by and among the ornaments by the central processor in accordance with a particular performance program.

In some preferred embodiments the socket string also functions to power Christmas tree lights plugged into one or more sockets. In some preferred embodiments, where a plurality of socket strings are used, each socket string can have or be assigned a unique identifier as well, enabling the central processor or other device connected to the socket string, to send information to, and receive information from, ornamental members plugged into the sockets on the socket string in a manner that allows for discernment from ornamental members plugged into another socket string on the same Christmas tree.

In other preferred embodiments, such as those involving artificial Christmas trees configured to operate an ornamental system of the type described in this instant invention, the powering or hanging locations on the branches or other ornamental member supporting means functions in the same or analogous manner to that described above regarding the socket string in that such locations are fixed and can function to provide information regarding the location and orientation of the ornamental members used in the ornamental system.

In some preferred embodiments, each ornamental member transmits and receives information via a unique or segregatable radio frequency or other segregating and identifying signal or other radiation means. In such embodiments, the user can associate content and/or performance control information with individual ornamental members to which the central processor will transmit such content and/or performance control information. In some preferred embodiments, for example, one or more ornamental members would operate on their own radio frequency or "channel" to better facilitate individual programming and/or communication with the central processor and/or one or more other devices.

In other preferred embodiments, one or more interactive ornamental members used in the instant invention are configured with a light generating means that allows each different ornamental member to generate an identification light of a different wavelength such that the different colors can be used in coordination with a means of signaling the ornamental member's identification as a means to detect the relative orientation of each ornamental member to the other ornamental members. In some preferred embodiments a photograph is taken by the user of a Christmas tree on which the interactive ornamental members are each emitting a different color that has been captured in the photograph. Next, such photograph is provided to the central processor that upon receiving the information in the photograph, provides a display of the orientation of the ornamental members in relation to one another for the user to use to transmit content and/or performance control information. In some preferred embodiments, identifying information transmitted by an ornamental member via other means (such as by radio as described above) can be associated with the light color information in the photograph to produce a displayed programming interface for the user to differentially program each ornamental member's content and/or performance control.

In some preferred embodiments, the display of one or more programming interfaces is on a mobile phone. In some preferred embodiments, the display of one or more programming interfaces is on a similar device, a PDA, or a remote control device. In other preferred embodiments, the selection of content, performance control and other programming information for the ornamental members is controlled by a mobile phone or other remote controlling device capable of communicating with the central processor.

For example a user using an mobile phone, or similar device, so configured would use of the device's internal screen, such as a touch screen, to decorate a displayed simulation of an initially undecorated Christmas tree with blank ornamental members for which the user subsequently associates selected content and/or performance programs. In some preferred embodiments, the user would be enabled to move or otherwise make modifications to the decoration of the displayed Christmas tree with a simulated display of interactive ornamental members of the type described in this invention to view and compare different decoration options. In some preferred embodiments in which information regarding the number, performance capabilities, unique identifiers, and relative locations of the interactive ornamental members is available to the central processor, such simulated decoration display means can be used to create versions of Christmas tree decoration using the ornamental system that would allow the content and the performance control information associated with such simulations to be transmitted by the central processor to the ornamental members. In some such preferred embodiments, the information regarding the number and types of ornamental members in the user's ornamental system can be transmitted to and used by a remote computer to provide to the user appropriately sorted ornamental member content and performance control data set options suitable for the user's current system. In some preferred embodiments in which relative ornamental member locational information is also provided, even more appropriate programming could be sent from remote computers or third party programmers able to actually view the orientation of the interactive ornamental members on the user's Christmas tree.

Figure 20:
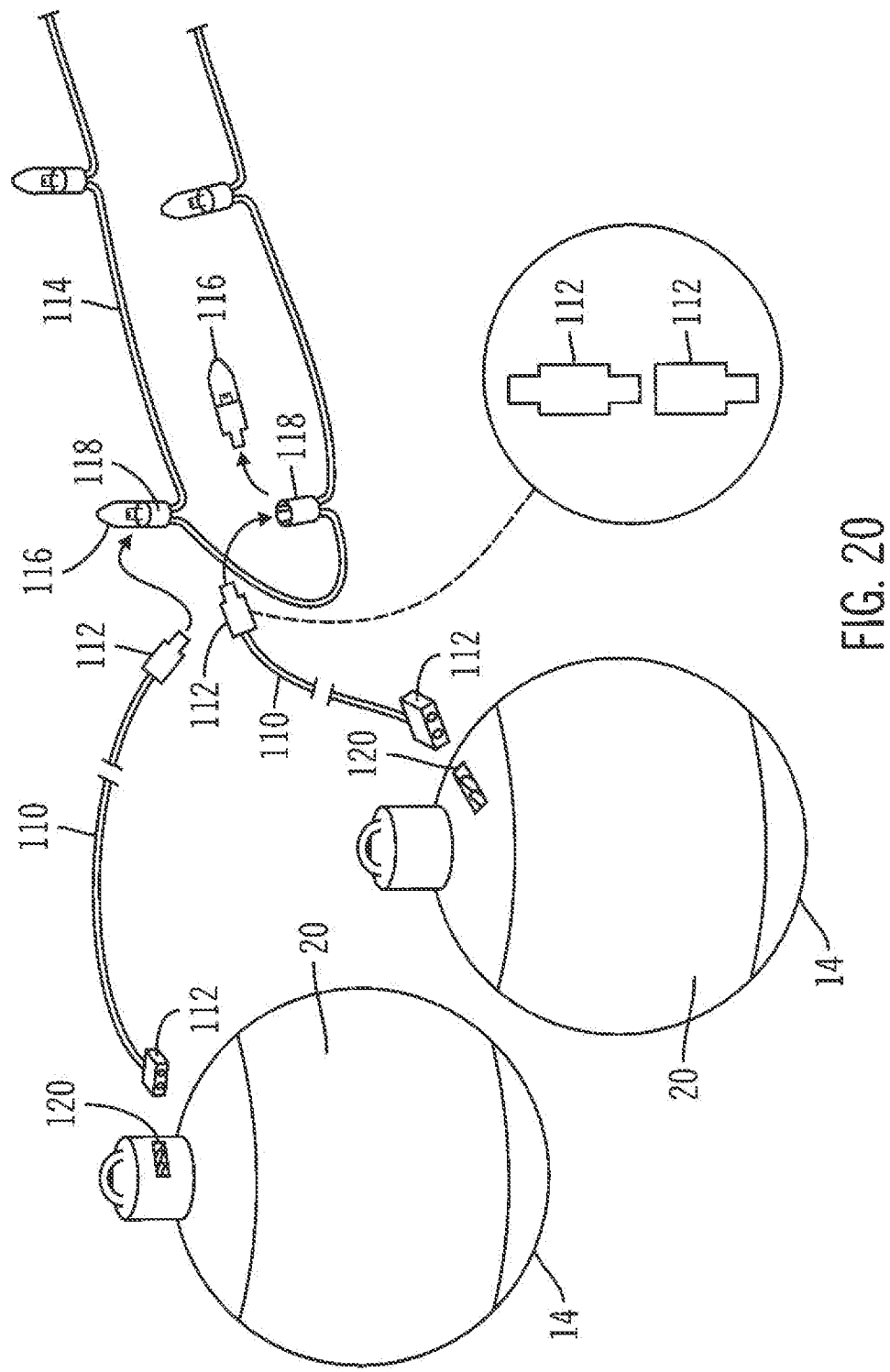
FIG. 20 depicts a configuration allowing ornamental members to be powered in accordance with a preferred embodiment of the invention.

With reference to FIG. 20, in some preferred embodiments, the powering of the ornamental member 14 can be accomplished through a small power acquisition device that comprises a power cord 110 with an adapter 112 on one or both ends to allow the interactive ornamental members to utilize the power used to energize a string 114 of common Christmas tree lights by enabling a user to unplug a light bulb 116 in such a string of lights at a location nearby to where the interactive ornamental member 14 is to be hung and replace such removed bulb 116 with a properly adapted end of said power cord 110 that will convey the power from said light string via socket 118 to the interactive ornamental members. In some preferred embodiments, the other end of the power acquisition device plugs into the neck 56 or body 18 of the ornamental member 14 via receptacle 120. In some preferred embodiments, the power acquisition device is colored, e.g., green or the color of the tree. In some preferred embodiments, a user is provided with one or more adaptors 112 to better effectuate the user's ability to use the power acquisition device with such a string of Christmas tree lights. In some preferred embodiments, the user is provided with one or more such power acquisition devices that are colored, e.g., green or the color of the tree. In some preferred embodiments, the wire is colored, e.g., green or the color of the tree. In some preferred embodiments, the user is provided with power acquisition devices of different lengths.

In some preferred embodiments, involving an artificial tree, one or more of the limbs of such artificial tree are configured so that a powering system for the interactive ornamental members is available on the branch, much the same way a track light has the two elements running down the track enabling users of such a track lighting system to position and power a track lighting light fixture at substantially any point along the track. In some preferred embodiments, similar powered tracks would be available for access by a clamp or other fixture that conveys power down a line to the interactive ornament. In some preferred embodiments, the track is unexposed under a shield that would be removable by the user at the particular location that power would be needed for an interactive ornamental member.

In some preferred embodiments, the ornamental members have their own powering harness wires. In this way, from a powering perspective, the ornamental members are analogous lights on a string of Christmas tree lights. In some preferred embodiments, the track and harness means of powering the ornamental members referenced above also include additional lines for the conveyance of digital information to and/or from ornamental members plugged into such track and harness means.

In some preferred embodiments, the ornamental member is configured with a compressed gas or dry ice that would allow a performance that would produce the effect of the frosting of the outside of the ornamental member in response to a signal from the central processor to release the gas.

In some preferred embodiments, the ornamental member is configured to emit evaporated scents, such as the scent of chestnuts roasting.

In some preferred embodiments, the ornamental system can coordinate the emission of gases and/or scents to coordinate with a song or other programming displayed or otherwise performed via one or more of the ornamental members. For example, if the ornamental system was displaying images of chestnuts roasting on an open fire in coordinated association with performance of the song "The Christmas Song", (commonly subtitled "Chestnuts Roasting on an Open Fire") by Mel Torme and Bob Wells, the scent of roasted chestnuts could be simultaneously emitted from one or more ornamental members configured with a means for dispensing the aroma of roasted chestnuts. Similarly the frosting of an ornamental member via compressed gas or dry ice vapor release could accompany the line "Jack frost nipping at your nose" in the same piece.

In some preferred embodiments, the ornamental system and/or individual ornamental members can be configured to provide a multimedia show in response to an external stimulus. For example, such a show can be triggered to commence in response to a radio signal or other triggering means. The radio signal or other triggering means can be provided, in some preferred embodiments, by an RFID or remote sensor, such as a proximity or motion detection sensor. As an example of such a process, a child's approach to an ornamental system or one or more ornamental members configured with an RFID or remote signal detection means can trigger a show on or by the ornamental system and/or one or more ornamental members at a time that the ornamental system or ornamental members has been programmed to respond to such approach or proximity detection (such as at a time when the child's parents have determined that the child should be in bed).

Further examples of such complex shows could include the generation of mist, smoke or similar vaporous emissions by the ornamental system or by one or more ornaments configured to emit such material, in order to provide a medium onto which holographic images, such as a holographic image of Santa Claus, could be projected via one or more projectors incorporated within the ornamental system, including via stand alone projectors configured to communicate with the ornamental system and/or via ornaments configured with one or more projectors capable of projecting images outside of the ornamental member as discussed above. Such a configured ornamental system could provide a show to the approaching child which is triggered by the child's approach, and in which images of Santa Claus, including for example, projected holographic images of Santa Claus, in coordination with an accompanying sound track, could advise the child to go back to bed. In some preferred embodiments of the above, the user could program the child's name or other special messages into the communication from the Santa Claus character depicted in the aforesaid images.

In some preferred embodiments of the ornamental system and ornamental members, the ornamental system and/or one or more individual ornamental members are configured to communicate with one or more of the user's televisions, computers, telephones, mobile devices and/or other audio-visual devices. As such, content used by or in the ornamental system and/or individual ornamental members is transmitted to the user's home entertainment system or parts thereof, such as a television. In some preferred embodiments, content comprising all or part of complex shows could be displayed on the user's television, other components of the user's home entertainment system, home computer(s), mobile telephone(s), etc. In some preferred embodiments, all or part of such complex shows can involve or can be otherwise coordinated with one or more toys and/or greeting cards configured with one or more processors capable of interacting with the ornamental system, one or more ornamental members or one or more external devices in communication with the ornamental system and/or one or more ornamental members.

In some preferred embodiments, one or more interactive ornamental members can be configured to produce an effect by which they seem to disappear and reappear. This effect can be accomplished by providing to the ornamental member visual information for display on substantially its entire body that comprises a photograph or videograph of tree leaves and/or branches, and in some embodiments, of the part of the Christmas tree corresponding to the location or the general location where the ornamental member is hung taken prior to the decoration of the Christmas tree, i.e., a photograph of videograph of only the tree itself at that location. In some such embodiments, if the central processor provides a display of content that alternates between such a photograph or videograph of the relevant area of the tree only with content comprising other material, such as an images of a skater on a pond skating around the equator of the ornamental member, the ornamental member will appear to disappear each time the images of the part of the Christmas tree generally corresponding to the location where the ornament is hung is displayed.

The invention claimed is:

1. An entertainment controller method, including:
   configuring a controller with a controller network interface coupled to a network, with a first relative ornament location information of a first ornamental device in a programming interface displayable on a mobile phone, where the first ornamental device has a first processor coupled to a first speaker, a first microphone, and a first network controller;
   configuring the controller with a second relative ornamental location information of a second ornamental device in the programming interface, where the second ornamental device has a second processor coupled to a second speaker, a second microphone, and a second network controller;
   identifying content suppliers to the controller in the programming interface;
   assigning performance characteristics in the interface to the first ornamental device and second ornamental device; and
   participating in a performance associated in response to the performance characteristics with the first ornamental device and a second ornamental device.

2. The entertainment controller method of claim 1, including selecting a performance associated with the performance characteristics in response to audio received at the controller network interface from the first microphone.

3. The entertainment controller method of claim 2, including activating the performance to be streamed to the first ornamental device and the second ornamental device in response to the performance characteristics.

4. The entertainment controller method of claim 1, including identifying at the controller an identity of a voice received at the controller network interface from the first microphone; and selecting a performance in response to the voice that was identified that contains the identity of the voice.

5. The entertainment controller method of claim 1, including communicating from the first ornamental device to the second ornamental device, where the first network controller and the second network controller are coupled by a wireless network.

* * * * *